United States Patent
Nishida

(10) Patent No.: US 10,479,377 B2
(45) Date of Patent: Nov. 19, 2019

(54) DRIVE ASSISTANCE SYSTEM AND CENTER

(71) Applicant: DENSO CORPORATION, Kariya, Aichi-pref. (JP)

(72) Inventor: Kentarou Nishida, Kariya (JP)

(73) Assignee: DENSON CORPORATION, Kariya, Aichi-pref. (JP)

( * ) Notice: Subject to any disclaimer, the term of this patent is extended or adjusted under 35 U.S.C. 154(b) by 66 days.

(21) Appl. No.: 15/521,626

(22) PCT Filed: Nov. 2, 2015

(86) PCT No.: PCT/JP2015/005501
§ 371 (c)(1),
(2) Date: Apr. 25, 2017

(87) PCT Pub. No.: WO2016/072082
PCT Pub. Date: May 12, 2016

(65) Prior Publication Data
US 2017/0232974 A1    Aug. 17, 2017

(30) Foreign Application Priority Data

Nov. 7, 2014 (JP) .................................. 2014-227242
Jul. 23, 2015 (JP) .................................. 2015-145924

(51) Int. Cl.
*B60W 50/08* (2012.01)
*G05D 1/00* (2006.01)
(Continued)

(52) U.S. Cl.
CPC ...... *B60W 50/082* (2013.01); *B60W 50/0098* (2013.01); *B60W 50/14* (2013.01);
(Continued)

(58) Field of Classification Search
None
See application file for complete search history.

(56) References Cited

U.S. PATENT DOCUMENTS 8,718,861 B1 * 5/2014 Montemerlo ......... B60W 30/00
701/26
9,274,525 B1 * 3/2016 Ferguson ............. G05D 1/0274
(Continued)

FOREIGN PATENT DOCUMENTS

JP    H06102148 A    4/1994
JP    H11039586 A    2/1999
(Continued)

OTHER PUBLICATIONS

Sarholz et al., "Evaluation of Different Approaches for Road Course Estimation using Imaging Radar", 2011 IEEE/RSJ International Conference on Intelligent Robots and Systems, Sep. 25-30, 2011, San Francisco, CA (Year: 2011).*
(Continued)

*Primary Examiner* — Tamara L Weber
(74) *Attorney, Agent, or Firm* — Harness, Dickey & Pierce, P.L.C.

(57) ABSTRACT

A drive assistance system includes an onboard device that is mounted on a vehicle performing automatic driving based on sensing information detected by a sensor of the vehicle, and a center that communicates with the onboard device. The onboard device includes a sensing information acquisition portion that acquires the sensing information. Either the onboard device or the center includes an evaluation portion that evaluates a detection performance of the sensor based on the sensing information. The center includes a region specification portion that specifies a decrease region where the detection performance of the sensor decreases, the decrease region specified by the detection performance, based on the sensing information, and the decrease region specified by a position at which the sensing information has been detected. The onboard device stops the automatic driving when the vehicle is located in the decrease region.

22 Claims, 13 Drawing Sheets

(51) Int. Cl.
    *G08G 1/01*          (2006.01)
    *B60W 50/00*       (2006.01)
    *B60W 50/14*       (2012.01)

(52) U.S. Cl.
    CPC ......... *G05D 1/0061* (2013.01); *G05D 1/0088* (2013.01); *G08G 1/01* (2013.01); *B60W 2050/0072* (2013.01); *B60W 2050/0095* (2013.01); *B60W 2550/402* (2013.01); *B60W 2550/408* (2013.01); *B60W 2750/40* (2013.01); *G05D 2201/0213* (2013.01)

(56) References Cited

U.S. PATENT DOCUMENTS

| | | |
|---|---|---|
| 2003/0065429 A1 | 4/2003 | Yamamoto et al. |
| 2003/0109980 A1 | 6/2003 | Kojima et al. |
| 2005/0004743 A1 | 1/2005 | Kojima et al. |
| 2012/0173185 A1* | 7/2012 | Taylor .................. G01B 11/026 702/104 |

FOREIGN PATENT DOCUMENTS

| | | |
|---|---|---|
| JP | 2003170760 A | 6/2003 |
| JP | 2003337993 A | 11/2003 |
| JP | 2006096325 A | 4/2006 |
| JP | 2009163434 A | 7/2009 |

OTHER PUBLICATIONS

Sung et al., "Autonomous Vehicle Guidance System with Infrastructure", Convergence Technology Research Department, 2013, p. 1-6 (Year: 2013).*

* cited by examiner

| AREA | TIME | TRANS-MISSION SOURCE | SENSOR 1 (GPS A TYPE) | SENSOR 2 (GPS B TYPE) | SENSOR 3 (3D GYRO A TYPE) | SENSOR 4 (3D GYRO B TYPE) | ... |
|---|---|---|---|---|---|---|---|
| MESH NO. 1 | 2014/1/1 13:00 | VEHICLE ID 1 | LEVEL 3 | NOT USED | NOT USED | LEVEL 3 | ... |
| | 2014/1/1 14:00 | VEHICLE ID 2 | NOT USED | LEVEL 2 | LEVEL 2 | NOT USED | ... |
| | ... | ... | ... | ... | ... | ... | ... |
| MESH NO. 2 | ... | VEHICLE ID 2 | NOT USED | LEVEL 3 | LEVEL 3 | NOT USED | ... |
| | ... | VEHICLE ID 3 | LEVEL 1 | NOT USED | LEVEL 2 | NOT USED | ... |
| | ... | ... | ... | ... | ... | ... | ... |
| ... | ... | ... | ... | ... | ... | ... | ... |

FIG. 20

| VEHICLE | VEHICLE TYPE | CONTINUOUS USE PERIOD (YEAR) | | | INSTALLATION POSITION | | |
|---|---|---|---|---|---|---|---|
| | | SENSOR A | ... | SENSOR X | SENSOR A | ... | SENSOR X |
| VEHICLE ID 1 | VEHICLE TYPE X | 1 | ... | 1 | ... | ... | ... |
| VEHICLE ID 2 | VEHICLE TYPE Y | 10 | ... | 10 | ... | ... | ... |
| ... | | ... | ... | ... | ... | ... | ... |

FIG. 21

| AREA | TIME | WEATHER STATE | TEMPERATURE [°C] | PRECIPITATION [mm] | WIND SPEED [m/sec] | ... |
|---|---|---|---|---|---|---|
| MESH NO. 1 | 2014/1/1 13:00 | RAIN | ... | ... | ... | ... |
| | 2014/1/1 14:00 | RAIN | ... | ... | ... | ... |
| | ... | ... | ... | ... | ... | ... |
| MESH NO. 2 | ... | ... | ... | ... | ... | ... |
| | ... | ... | ... | ... | ... | ... |
| ... | ... | ... | ... | ... | ... | ... |

FIG. 22

| AREA | VEHICLE TYPE | TIME ZONE | WEATHER | ... | SENSOR A | SENSOR B | ... |
|---|---|---|---|---|---|---|---|
| MESH NO. 1 | VEHICLE TYPE X | JUNE - AUGUST ALL DAY | RAIN | ... | 3 | 1 | ... |
| | ALL VEHICLE TYPES | DECEMBER - FEBRUARY ALL DAY | SNOWSTORM | ... | 1 | 1 | ... |
| | ... | ... | ... | ... | ... | ... | ... |
| MESH NO. 2 | VEHICLE TYPE Y | ... | ... | ... | ... | ... | ... |
| | ... | ... | ... | ... | ... | ... | ... |
| ... | ... | ... | ... | ... | ... | ... | ... |

DRIVE ASSISTANCE SYSTEM AND CENTER

CROSS-REFERENCE TO RELATED APPLICATIONS

This application is a U.S. National Phase Application under 35 U.S.C. 371 of International Application No. PCT/JP2015/005501 filed on Nov. 2, 2015 and published in Japanese as WO 2016/072082 A1 on may 12, 2016. This application is based on and claims the benefit of priority from Japanese Patent Application No. 2014-227242 filed on Nov. 7, 2014 and Japanese Patent Application No. 2015-145924 filed on Jul. 23, 2015. The entire disclosures of all of the above applications are incorporated herein by reference.

TECHNICAL FIELD

The present disclosure relates to a drive assistance system that assists automatic driving, and to a center included in the drive assistance system.

BACKGROUND ART

Conventional automatic vehicle driving technologies include semi-automatic driving, such as following travel control that performs automatic acceleration and deceleration control to keep a target distance from a preceding vehicle detected by a radar or other sensors. Also proposed in recent years is semi-automatic driving, such as automatic steering control that maintains a current lane with reference to a white line detected by a camera or other sensors, and full-automatic driving that autonomously controls all of acceleration, steering, and braking by using multiple sensors provided on a subject vehicle.

In case of automatic driving that uses a sensor, however, a stop of automatic driving may be necessary when the sensor is in an abnormal condition.

For meeting this necessity, there has been disclosed in Patent Literature 1, for example, a technology that stops automatic driving when detection accuracy of a sensor used for automatic driving decreases. According to the technology disclosed in Patent Literature 1, it is determined that an output from a subject vehicle position detection means is abnormal when a shift amount of a subject vehicle calculated based on a subject vehicle position sequentially detected by the subject vehicle position detection means with a global positioning system (GPS) is extremely larger than a shift amount of the vehicle calculated based on a vehicle speed sequentially detected by a vehicle speed detection means. When it is determined that the output from the subject vehicle position detection means is abnormal, a part or the whole of functions of a traveling control device stops.

PRIOR ART LITERATURE

Patent Literature

Patent Literature 1: JP 2003-170760 A

SUMMARY OF INVENTION

According to the technology disclosed in Patent Literature 1, however, the functions of the traveling control device stop only after the abnormality of the output of the sensor is determined. In this case, automatic driving is difficult to stop prior to actual decreasing of a detection performance of the sensor when the subject vehicle is located in a region where the detection performance of the sensor such as sensor accuracy and sensitivity easily decreases.

It is an object of the present disclosure to provide a drive assistance system and a center capable of stopping automatic driving prior to actual decreasing of a detection performance of a sensor used for automatic driving in a region where the detection performance of the sensor easily decreases.

A drive assistance system according to one example of the present disclosure includes an onboard device that is mounted on a vehicle performing automatic driving based on sensing information detected by a sensor of the vehicle, and a center that communicates with the onboard device. The onboard device includes a sensing information acquisition portion that acquires the sensing information detected by the sensor. Either the onboard device or the center includes an evaluation portion that evaluates a detection performance of the sensor based on the sensing information acquired by the sensing information acquisition portion. The center includes a region specification portion that specifies a decrease region where the detection performance of the sensor decreases, the decrease region specified by the detection performance of the sensor evaluated by the evaluation portion, based on the sensing information, and the decrease region specified by a position at which the sensing information has been detected. The onboard device stops the automatic driving when the vehicle is located in the decrease region specified by the region specification portion.

A center according to another example of the present disclosure includes a center evaluation portion that communicates with an onboard device mounted on a vehicle performing automatic driving based on sensing information detected by a sensor of the vehicle, and evaluates a detection performance of the sensor based on the sensing information transmitted from the onboard device, and a region specification portion that specifies a decrease region where the detection performance of the sensor decreases, the decrease region specified based on the detection performance of the sensor evaluated by the center evaluation portion based on the sensing information, and the decrease region specified based on a position at which the sensing information has been detected for each of a plurality of vehicles.

According to these configurations, a decrease region is specified as an area where a detection performance of a sensor detecting sensing information used for automatic driving decreases. Automatic driving stops when a vehicle is located in the decrease region. The decrease region is specified based on a detection performance of a sensor contained in each of multiple vehicles and evaluated by the evaluation portion based on sensing information. The decrease region is also specified based on the position at which the corresponding sensing information has been detected. By utilizing a decrease region specified based on sensing information acquired by a different vehicle, automatic driving of a vehicle is allowed to stop prior to actual decreasing of a detection performance of a sensor included in the vehicle when the vehicle is located in this decrease region.

Accordingly, a stop of automatic driving is realizable prior to actual decreasing of a detection performance of a sensor provided on a vehicle and used for automatic driving when the vehicle is located in an area where the detection performance of the sensor easily decreases.

BRIEF DESCRIPTION OF DRAWINGS

The above and other aspects, features and advantages of the present disclosure will become more apparent from the following detailed description made with reference to the accompanying drawings. In the drawings:

FIG. 20 is a view explaining an example of information registered in a vehicle information DB;

FIG. 21 is a view explaining an example of information registered in an environment information DB; and FIG. 22 is a view explaining an example of information registered in a decrease area management DB.

DESCRIPTION OF EMBODIMENTS

An embodiment according to the present disclosure will be hereinafter described with reference to the drawings.

(First Embodiment)

(Drive assistance system 100)

Figure 1:
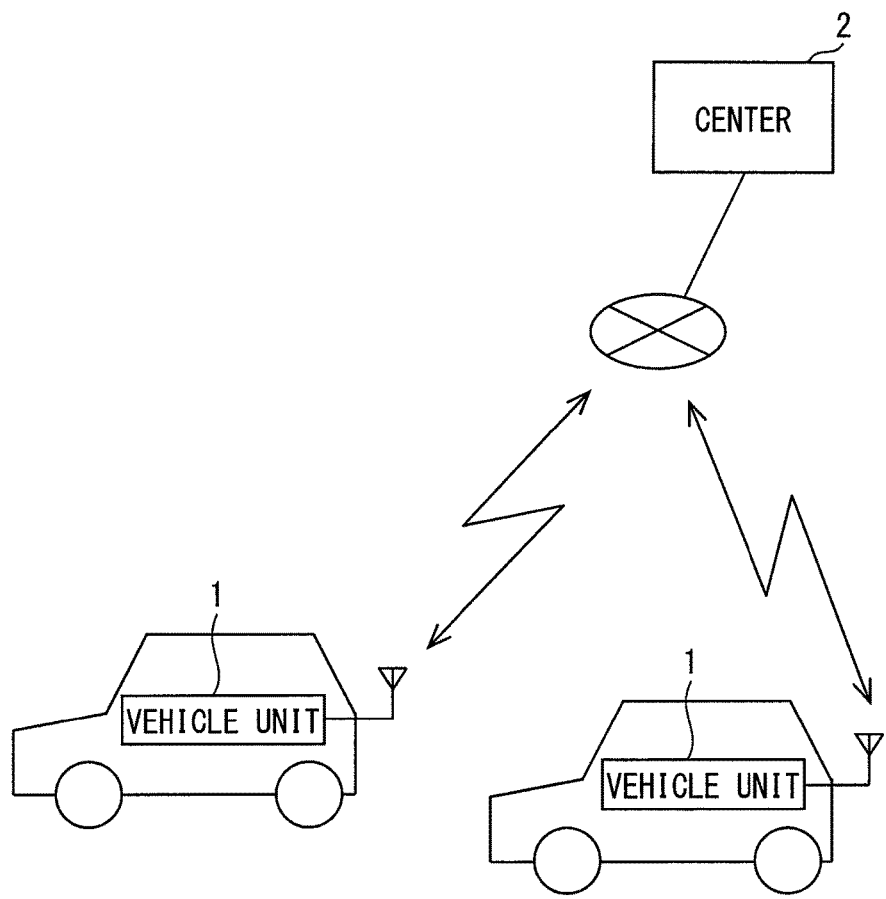
FIG. 1 is a view illustrating an example of a schematic configuration of a drive assistance system.

FIG. 1 is a view illustrating an example of a schematic configuration of a drive assistance system 100 to which the present disclosure has been applied. The drive assistance system 100 illustrated in FIG. 1 includes vehicle units 1 each of which is mounted on corresponding one of vehicles, and a center 2.

(Schematic configuration of vehicle unit 1)

Figure 2:
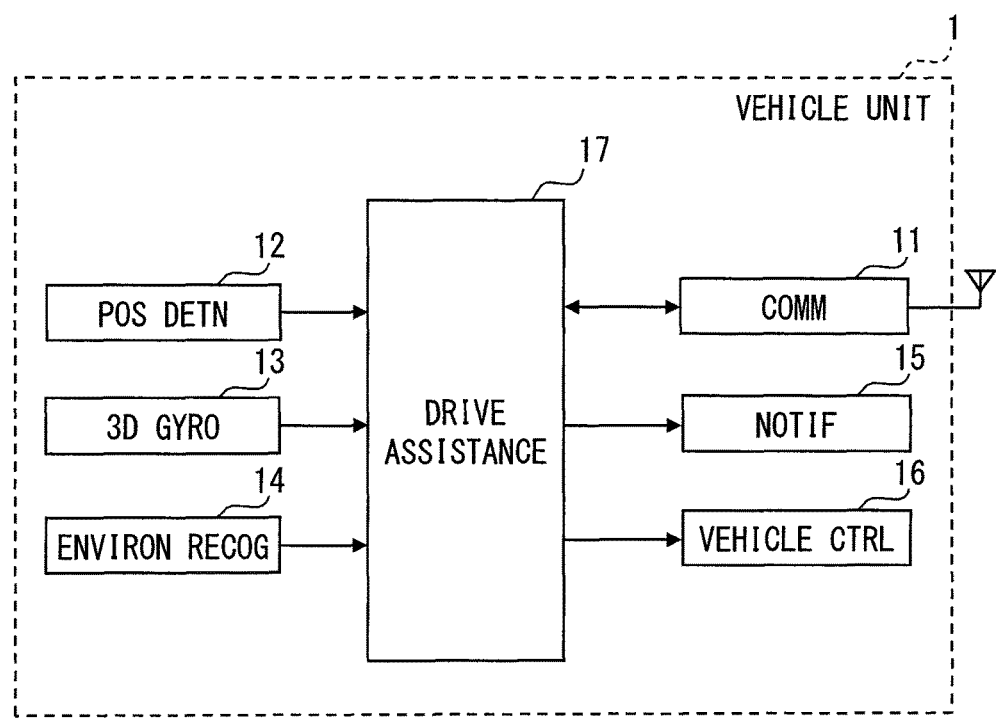
FIG. 2 is a block diagram illustrating an example of a schematic configuration of a vehicle unit.

Each of the vehicle units 1 is mounted on a vehicle. As illustrated in FIG. 2, each of the vehicle units 1 includes a communicator 11, a position detector 12, a 3D gyro sensor 13, an environment recognition system 14, a notification device 15, a vehicle control electronic controller (ECU) 16, and a drive assistance ECU 17.

The communicator 11 communicates with the center 2 via a communication network such as the Internet and a cellular phone network. The communicator 11 may be constituted by an in-vehicle communication module such as a data communication module (DCM) mounted on a vehicle. Alternatively, the communicator 11 may be constituted by a dedicated short range communications (DSRC) communication module, or a portable terminal.

The position detector 12 sequentially detects a current position of a vehicle (hereinafter referred to as vehicle position) on which the position detector 12 is mounted based on information obtained by a sensor such as a receiver included in a global positioning system. A vehicle speed sensor, a gyroscope or other sensors may be used for detection of the vehicle position. It is assumed that the vehicle position is represented by a latitude-longitude coordinate system, for example.

The 3D gyro sensor 13 includes a gyro sensor that detects a rotation angular speed of a vehicle on which the 3D gyro sensor 13 is mounted, and further includes a vehicle speed sensor that detects a traveling speed of the vehicle, and an acceleration sensor that detects acceleration of the vehicle in the front-rear direction. The 3D gyro sensor 13 calculates an advancing direction of the vehicle, and a gradient angle of a road on which the vehicle is traveling based on detection results of the respective sensors. The 3D gyro sensor 13 may be realized by a three-axis gyro sensor that detects rotation angular speeds around three axes crossing each other at right angles.

The environment recognition system 14 detects a target from an image captured by a camera on the vehicle by using an image recognition technology. This image shows a region extending in a predetermined angle range around the vehicle. The target to be detected may be a vehicle such as a proceeding vehicle, a feature element such as a road sign and a signboard, a branching point of a road, or a white line as a road sectioning line. Multiple cameras may be included in the environment recognition system 14 to expand the imaging range to the entire circumference of the vehicle in the front-rear and left-right directions.

The environment recognition system 14 further detects a position of a detected target. When the camera is a monocular camera, for example, the environment recognition system 14 detects an orientation and a distance (that is, relative position) of the target relative to the subject vehicle based on an installation position and a direction of an optical axis of the camera relative to the subject vehicle, and the position of the target in a captured image. On the other hand, when the camera constitutes a stereo camera, a distance between the subject vehicle and the target is determined based on a parallax amount between a pair of cameras. The environment recognition system 14 may further detect latitude-longitude coordinates of the target based on the vehicle position detected by the position detector 12 and a relative position of the target with respect to the subject vehicle.

The notification device 15 is a display device or an audio output device. The notification device 15 displays a text or an image in accordance with an instruction issued from the drive assistance ECU 17, or outputs voices to issue notification to a driver of the vehicle.

The vehicle control ECU 16 is an electronic control device that performs acceleration and deceleration control and steering control of the vehicle. Examples of the vehicle control ECU 16 include a steering ECU for steering control, an engine ECU for acceleration and deceleration control, and a braking ECU.

Each type of the drive assistance ECU 17 includes a CPU, a memory such as a read only memory (ROM) and a random access memory (RAM), an input/output (I/O), and a bus for connecting these components. The ROM stores a program under which a normal computer operates as the drive assistance ECU 17 according to the present embodiment. The storage medium storing this program is not limited to the ROM, but may be other types of storage medium as long as the storage medium is a non-transitory tangible storage medium. Execution of the program by the CPU corresponds to execution of a method corresponding to the program. The drive assistance ECU 17 executes the program stored in the ROM based on various information input from the communicator 11, the position detector 12, the 3D gyro sensor 13, the environment recognition system 14 to perform various control processes described later.

For example, the drive assistance ECU 17 allows the vehicle control ECU 16 to automatically perform steering control and acceleration and deceleration control based on information detected by sensors such as the position detector 12, the 3D gyro sensor 13, and the environment recognition system 14 (hereinafter referred to as sensing information). In other words, the drive assistance ECU 17 allows the vehicle control ECU 16 to perform automatic driving. Accordingly, each of the position detector 12, the 3D gyro sensor 13, and the environment recognition system 14 corresponds to an example of a sensor. The drive assistance ECU 17 corresponds to an example of an onboard device.

Examples of the acceleration and deceleration control performed by the vehicle control ECU 16 include following travel control that automatically performs acceleration and deceleration control for keeping a target distance from a proceeding vehicle detected by the environment recognition system 14. A distance measurement sensor such as a radar mounted on the vehicle may be used for detection of a proceeding vehicle.

Examples of the steering control performed by the vehicle control ECU 16 include lane maintaining control that automatically performs steering control for maintaining a traveling lane sandwiched between white lines detected by the environment recognition system 14. Examples of the steering control further include automatic steering control for avoiding an obstacle detected by the environment recognition system 14. A distance measurement sensor such as a radar mounted on the vehicle may be used for detection of an obstacle.

The automatic driving may be full-automatic driving that autonomously performs all of acceleration, steering, and braking under control by the subject vehicle, or may be semi-automatic driving that autonomously performs a part of acceleration, steering, and braking under control by the subject vehicle. For example, automatic steering control may be performed such that a vehicle position detected by the position detector 12, and an advancing direction detected by the 3D gyro sensor 13 are changeable along a route from the current position to a set destination.

In addition, the drive assistance ECU 17 performs an upload process for transmitting sensing information detected by sensors such as the position detector 12, the 3D gyro sensor 13, and the environment recognition system 14 to the center 2, and a vehicle control related process for issuing notification and stopping automatic driving based on distribution information such as decrease area information (described below) transmitted from the center 2.

(Schematic configuration of drive assistance ECU 17)

Figure 3:
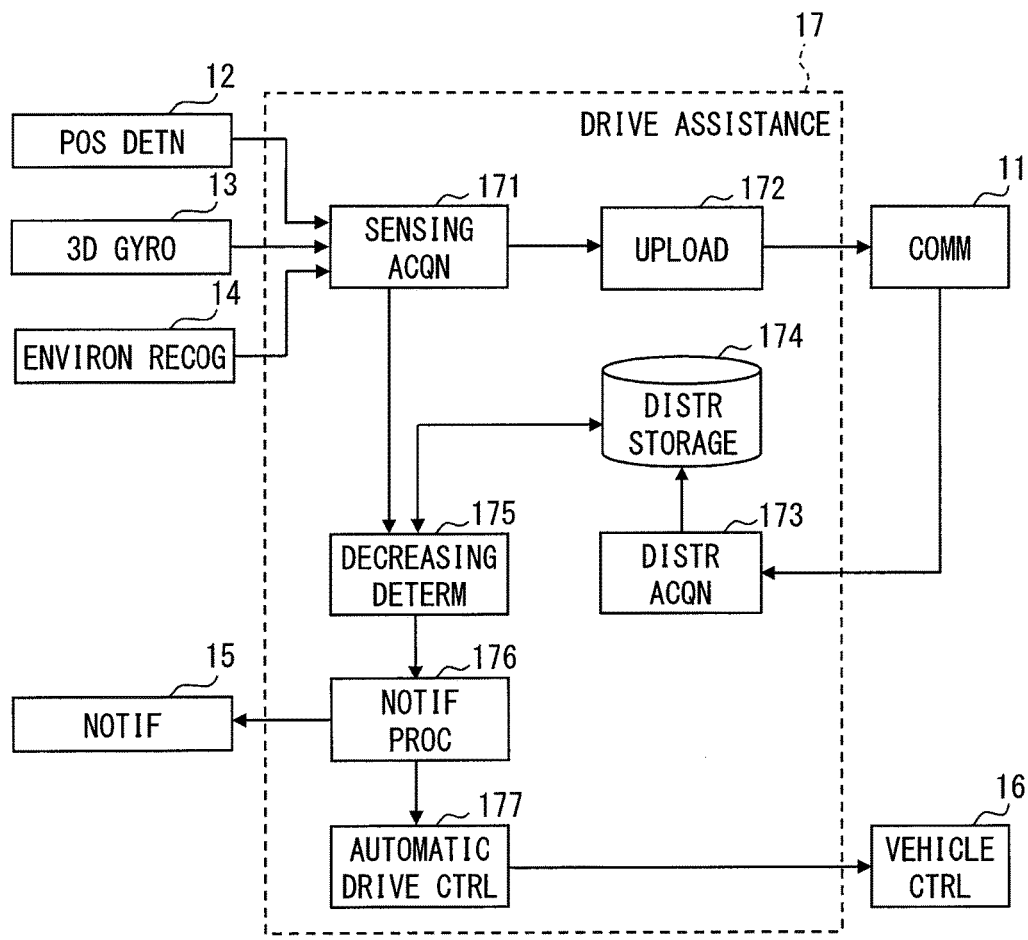
FIG. 3 is a block diagram illustrating an example of a schematic configuration of a drive assistance ECU.

As illustrated in FIG. 3, the drive assistance ECU 17 includes a sensing information acquisition portion 171, an upload portion 172, a distribution information acquisition portion 173, a distribution information storage portion 174, a decrease determination portion 175, a notification process portion 176, and an automatic driving controller 177. Each of the sensing information acquisition portion 171, the upload portion 172, the distribution information acquisition portion 173, the decrease determination portion 175, the notification process portion 176, and the automatic driving controller 177 may constitute software realized by the CPU under the program stored in the ROM. On the other hand, the distribution information storage portion 174 may be realized by a rewritable storage device.

Alternatively, each of the sensing information acquisition portion 171, the upload portion 172, the distribution information acquisition portion 173, the decrease determination portion 175, the notification process portion 176, and the automatic driving controller 177 included in the drive assistance ECU 17 may constitute hardware realized by one or multiple integrated circuits (ICs).

The sensing information acquisition portion 171 sequentially acquires sensing information detected by the position detector 12, the 3D gyro sensor 13, and the environment recognition system 14. The sensing information is a vehicle position for the position detector 12. For the 3D gyro sensor 13, the sensing information corresponds to a traveling speed, acceleration in the front-rear direction, a rotation angular speed, and an advancing direction of the vehicle, and a gradient angle of a road on which the vehicle is traveling, for example. For the environment recognition system 14, the sensing information is a position of a target detected by an image recognition system on a map, for example. The upload portion 172 transmits the sensing information acquired by the sensing information acquisition portion 171 to the center 2 via the communicator 11.

The distribution information acquisition portion 173, the distribution information storage portion 174, the decrease determination portion 175, the notification process portion 176, and the automatic driving controller 177 will be described in detail later.

(Upload process by drive assistance ECU 17)

Figure 4:
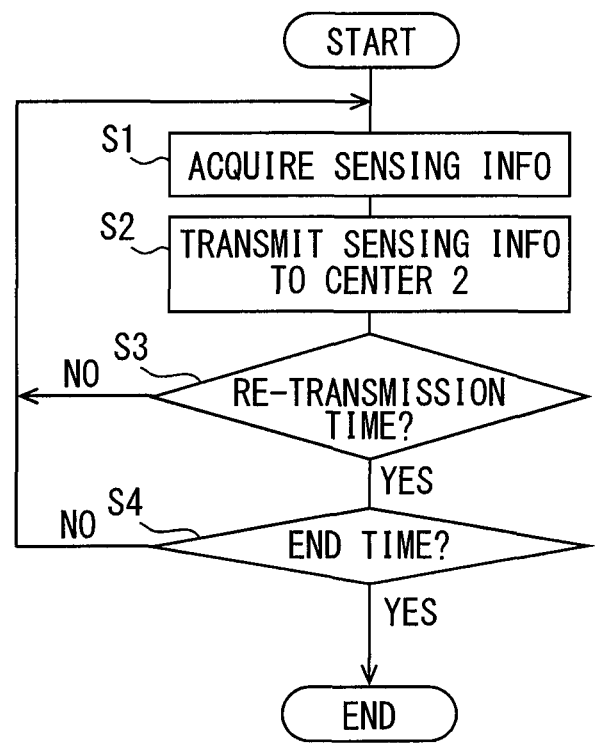
FIG. 4 is a flowchart showing an example of a flow of an upload process performed by the drive assistance ECU.

An example of a flow of an upload process performed by the drive assistance ECU 17 will be hereinafter described with reference to a flowchart shown in FIG. 4. The upload process is a process in which sensing information detected by sensors is transmitted to the center 2 as described above. It is assumed that the flowchart shown in FIG. 4 starts when an ignition power source of the vehicle is turned on, for example.

Initially, the sensing information acquisition portion 171 acquires sensing information detected by the position detector 12, the 3D gyro sensor 13, and the environment recognition system 14 in S1.

In S2, the upload portion 172 transmits the sensing information acquired in S1 to the center 2 via the communicator 11. For example, the upload portion 172 transmits the sensing information in association with sensor identification information for specifying a type of a sensor having detected the corresponding sensing information, and a classification of the sensor within an identical type, transmission source identification information for specifying a transmission source, and a time stamp for each sensing information at the time of transmission of the sensing information to the center 2. It is assumed herein that the time stamp is a time stamp indicating transmission time, for example. However, the time stamp may be a time stamp indicating acquisition time of sensing information.

It is preferable that sensing information obtained by sensors other than the position detector 12 (such as the 3D gyro sensor 13) is transmitted in association with vehicle position information at the time of acquisition of the sensing information.

The type of sensors in this context is a group of sensors divided for each different detection principle, such as the position detector 12, the 3D gyro sensor 13, and the environment recognition system 14. The classification of sensors in this context is a group of sensors grouped into an identical type and divided for each manufacturer and model. The sensor identification information may include identification information for each type of sensors, and identification information for each classification of sensors. The transmission source identification information may be a device identification (ID) of the drive assistance ECU 17 or the communicator 11, or may be a vehicle ID of a vehicle on which the vehicle unit 1 is mounted. The present embodiment will be described on the assumption that the transmission source identification information is a vehicle ID.

In S3, the flow returns to S1 to repeat process when it is determined that the current time is re-transmission time of sensing information (S3: YES). On the other hand, when it is determined that the current time is not re-transmission time of sensing information (S3: NO), the flow shifts to S4. The time interval of re-transmission of sensing information may be set to a certain time period from previous transmission of sensing information. In this case, sensing information is regularly transmitted from the vehicle unit 1 to the center 2.

In S4, the upload process ends when it is determined that the current time is an end time of the upload process (S4: YES). When it is determined that the current time is not the end time of the upload process (S4: NO), the flow returns to S1 to repeat process. The end time of the upload process is determined when the ignition power source of the vehicle is turned off, for example.

(Schematic configuration of center 2)

Figure 5:
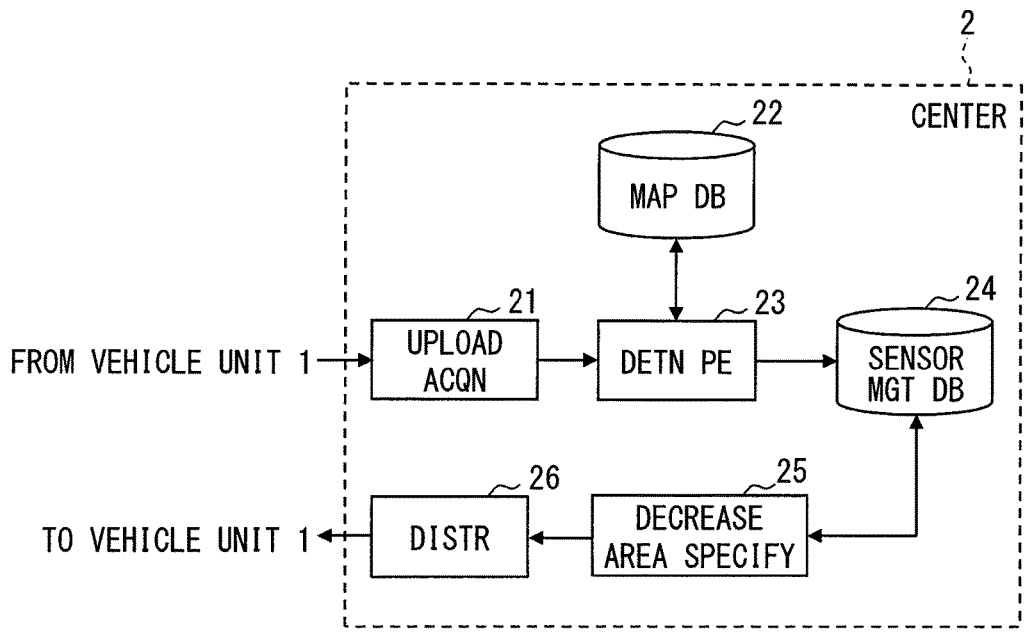
FIG. 5 is a block diagram illustrating an example of a schematic configuration of a center.

An example of a schematic configuration of the center 2 is now described with reference to FIG. 5. The center 2 is, for example, a server device that includes an upload information acquisition portion 21, a map data base (hereinafter referred to as map DB) 22, a detection performance evaluation portion 23, a sensor information management database (hereinafter referred to as sensor information management DB) 24, an specification portion 25, and a distribution portion 26 as illustrated in FIG. 5. The center 2 may be constituted by either a single server device, or multiple server devices.

The upload information acquisition portion 21 sequentially acquires sensing information transmitted from the vehicle unit 1, and acquires sensor identification information, transmission source identification information, and a time stamp associated with the sensing information.

The map DB 22 stores map data including road data constituted by node data and link data, data on respective points of interest (POI), and other data. The link in this context refers to a connection between multiple nodes, such as intersections, branches, and junction points, formed to divide each of roads on an electronic map The link data is constituted by respective data on a unique number for specifying a link (link ID), a link length indicating a length of a link, a link direction, link shape information, node coordinates of an initial end and a final end of a link (latitude/longitude), an actual link gradient, and a road attribute. The node data is constituted by respective data on a node ID indicating a unique number given to each node on the map, node coordinates, a node name, a node type, and others. The POI data is data on a name, an address, a position, and an attribute of a POI, for example.

The detection performance evaluation portion 23 evaluates a detection performance of a sensor such as the position detector 12, the 3D gyro sensor 13, and the environment recognition system 14 based on sensing information acquired by the upload information acquisition portion 21. The detection performance evaluation portion 23 corresponds to an example of an evaluation portion (more specifically, center evaluation portion). The detection performance evaluation portion 23 further registers a detection performance of an evaluated sensor in a sensor information management DB 24. Detection performances of sensors are evaluated by the detection performance evaluation portion 23 based on sensing information transmitted from the respective vehicle units 1 of the plurality of vehicles, and are registered in the sensor information management DB 24. Accordingly, detection performances of respective sensors mounted on each of the plurality of vehicles are registered in the sensor information management DB 24.

The decrease area specification portion 25 specifies an area where a detection performance of a sensor decreases, based on detection performances of sensors evaluated in accordance with sensing information, and positions at which the sensing information is detected for each of the plurality of vehicles. The decrease area specification portion corresponds to an example of a region specification portion. The distribution portion 26 transmits information on an area specified by the decrease area specification portion 25 to the vehicle unit 1. The distribution portion 26 corresponds to an example of a decrease region transmission process portion.

(Information management related process by center 2)

Figure 6:
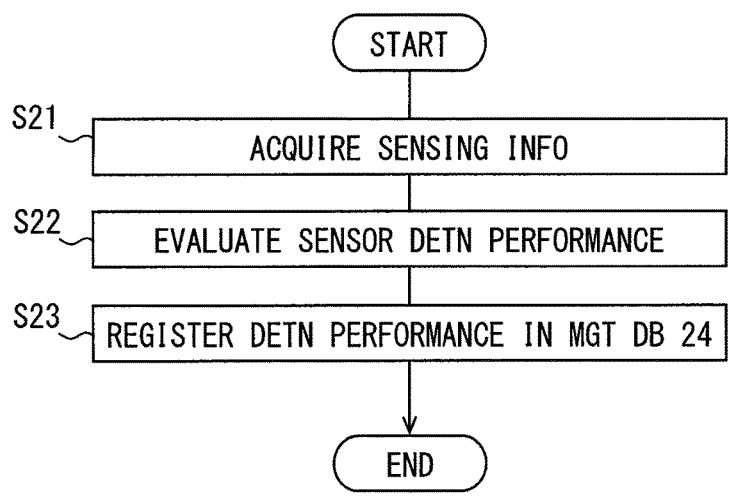
FIG. 6 is a flowchart showing an example of a flow of an information management related process performed by the center.

An example of a flow of an information management related process performed by the center 2 will be hereinafter described with reference to a flowchart shown in FIG. 6. The information management related process is a process in which sensing information transmitted from the vehicle unit 1 is acquired, a detection performance of a sensor is evaluated based on the acquired sensing information, and the evaluated detection performance of the sensor is registered in the sensor information management DB 24. The flowchart shown in FIG. 6 starts when sensing information is transmitted from the vehicle unit 1 to the center 2.

Initially, in S21, the upload information acquisition portion 21 acquires sensing information transmitted from the vehicle unit 1, and acquires sensor identification information, transmission source identification information, and a time stamp associated with the sensing information. The sensing information, the sensor identification information, the transmission source identification information, and the time stamp acquired by the upload information acquisition portion 21 may be sequentially accumulated in a volatile memory, for example.

In S22, the detection performance evaluation portion 23 evaluates detection performances of sensors such as the position detector 12, the 3D gyro sensor 13, and the environment recognition system 14 based on the sensing information acquired by the upload information acquisition portion 21. For example, the detection performance evaluation portion 23 evaluates detection performances of the sensors based on a comparison between the sensing information acquired by the upload information acquisition portion 21 and map data stored in the map DB 22.

Figure 7:
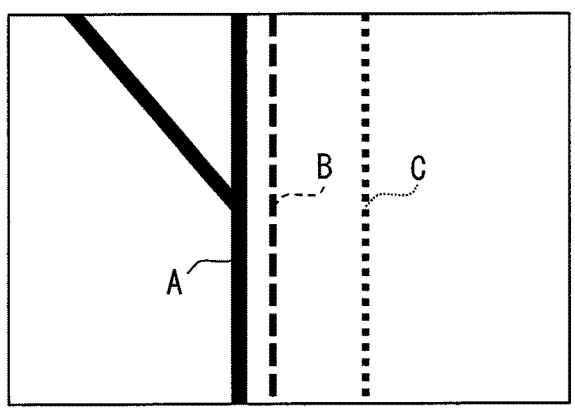
FIG. 7 is a view explaining a specific example of a process for evaluating a detection performance of a position detector.
Figure 8:
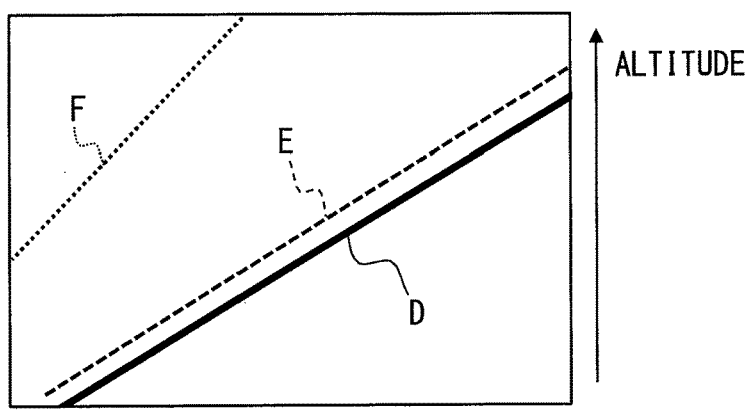
FIG. 8 is a view explaining a specific example of a process for evaluating a detection performance of a 3D gyro sensor.
Figure 9:
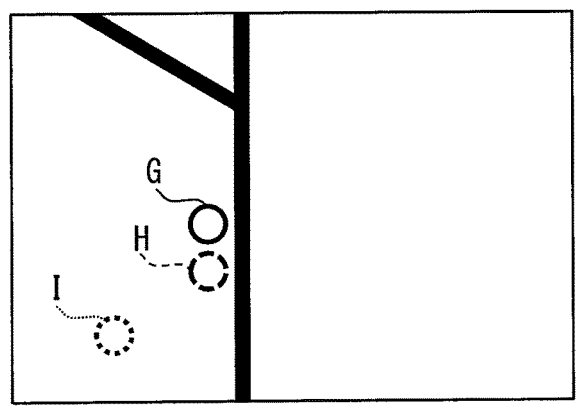
FIG. 9 is a view explaining a specific example of a process for evaluating a detection performance of an environment recognition system.

A specific example of a process for evaluating detection performances of sensors performed by the detection performance evaluation portion 23 will be herein described with reference to FIGS. 7 to 9.

Initially, a specific example of a process for evaluating a detection performance of the position detector 12 will be described with reference to FIG. 7. Before evaluating the detection performance of the position detector 12, preprocess is performed to generate a traveling track corresponding to a time-series arrangement of respective sets of information on vehicle positions contained in sensing information sequentially acquired by the upload information acquisition portion 21, and received from an identical transmission source.

Thereafter, the generated traveling track is compared with a road indicated in map data stored in the map DB 22 (see A in FIG. 7) to evaluate a detection performance based on a degree of an error between the traveling track and the road. The road to be compared may be a road having the closest shape within a predetermined range from the traveling track. In FIG. 7, B indicates a traveling track with a high evaluation of a detection performance, and C indicates a traveling track with a low evaluation of a detection performance. Multiple thresholds may be set for evaluation of a detection performance to provide stage evaluation from levels 1 to 3, for example.

A specific example of a process for evaluating a detection performance of the 3D gyro sensor 13 will be described with reference to FIG. 8. Before evaluating the detection performance of the 3D gyro sensor 13, preprocess is performed to generate an altitude change track corresponding to a time-series arrangement of respective sets of sensing information contained in sensing information on the 3D gyro sensor 13 sequentially acquired by the upload information acquisition portion 21, and received from an identical transmission source.

Thereafter, the generated altitude change track is compared with a link actual gradient contained in map data stored in the map DB 22 (see D in FIG. 8) to evaluate a detection performance based on a degree of an error between the altitude change track and the link actual gradient. The link to be compared may be a link specified by map matching between the link and the location of the target vehicle. In FIG. 8, E indicates an altitude change track with a high evaluation of a detection performance, and F indicates an altitude change track with a low evaluation of a detection performance.

A specific example of a process for evaluating a detection performance of the environment recognition system 14 will be described with reference to FIG. 9. For evaluating the detection performance of the environment recognition system 14, a latitude and longitude coordinate system of a target acquired by the upload information acquisition portion 21 is used.

In a configuration in which a relative position of a target with respect to the subject vehicle is transmitted from the vehicle unit 1 as sensing information of the environment recognition system 14, the following preprocess may be performed. More specifically, as preprocess, the position of the target on the map is determined based on the relative position, which is the sensing information from the environment recognition system 14, of the target with respect to the subject vehicle, and the vehicle position that is the sensing information from the position detector 12.

Thereafter, the latitude and longitude coordinates of the target are compared with actual coordinates of the target on the map data stored in the map DB 22 (see G in FIG. 9) to evaluate a detection performance based on a degree of an error between both the positions. In FIG. 9, H indicates latitude and longitude coordinates of the target with a high evaluation of a detection performance, and I indicates latitude and longitude coordinates of the target with a low evaluation of a detection performance. The target may be a feature element such as a road sign and a signboard, and a branching point of a road, for example. Actual coordinates of a feature element such as a road sign and a signboard are specified by utilizing POI data contained in the map data, and actual coordinates of a branching point of a road are specified by utilizing node data contained in the map data.

As described above, a detection performance of a sensor is more accurately evaluated by comparison with a comparison target corresponding to information that does not vary by disturbance, that is, map data obtained by measurement.

When different classifications are present within an identical type of sensors, thresholds different for each classification may be set for evaluating a detection performance.

Returning to FIG. 6, the detection performance evaluation portion 23 registers the detection performance of the sensor evaluated in S22 in the sensor information management DB 24, and ends the information management related process in S23. An example of information registered in the sensor information management DB 24 will be described with reference to FIG. 10. According to the example illustrated in FIG. 10, detection performances of sensors are expressed in three stages of levels 1 to 3. It is assumed that a detection performance decreases with a drop of the level, and that a detection performance increases (or a degree of normality in operation increases) with a rise of the level.

Figures 10, 11:
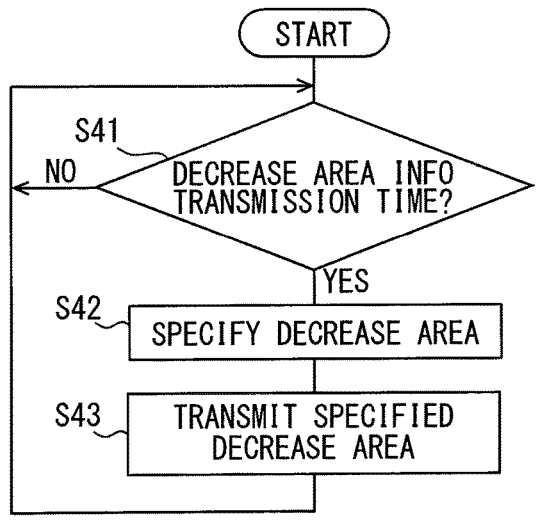
FIG. 10 is a view explaining an example of information registered in a sensor information management DB.
FIG. 11 is a flowchart showing an example of a flow of a distribution related process performed by the center.

As illustrated in FIG. 10, detection performances of evaluated sensors are registered for each area, time indicated by a time stamp, and transmission source indicated in transmission source identification information. The area in this context refers to an area sectioned by a predetermined unit such as an administrative district and a mesh in a map. It is assumed in the description of the present embodiment that the area is sectioned in units of mesh by way of example. Each area may be sectioned in correspondence with a mesh number to allow determination of an area corresponding to a detection performance based on a vehicle position obtained from the position detector 12 as sensing information.

When multiple types of evaluated sensors are present, detection performances of the respective types of sensors are registered in the sensor information management DB 24. For example, when the evaluated sensors are three types of sensors constituted by the position detector 12, the 3D gyro sensor 13, and the environment recognition system 14, detection performances of the three types of sensors are registered in the sensor information management DB 24. When different classifications are included in an identical type of sensors, detection performances are registered for each different item of classifications. An example illustrated in FIG. 10 indicates the presence of classifications of GPSA type and GPSB type for the position detector 12, and the presence of 3D gyro A type and 3D gyro B type for the 3D gyro sensor 13.

(Distribution related process by center 2)

An example of a flow of a distribution related process performed by the center 2 will be hereinafter described with reference to a flowchart shown in FIG. 11. The distribution related process is a process in which an area where a detection performance of a sensor decreases is specified, and information on this area is transmitted to the vehicle unit 1. It is assumed that the flowchart shown in FIG. 11 is repeated in a period from an on-state of a power source of the center 2 to an off-state of the power source of the center 2.

Initially, when it is determined in S41 that the current time is a time for transmitting information on an area where a detection performance of a sensor decreases (hereinafter referred to as decrease area) (S41: YES), the flow shifts to S42. On the other hand, when it is determined that the current time is not the time for transmitting decrease area information (S41: NO), the process in S41 is repeated. The time for transmitting decrease area information is set to a fixed time to allow transmission at fixed time intervals, for example.

In S42, the decrease area specification portion 25 specifies a decrease area based on information registered in the sensor information management DB 24. For example, the decrease area may be specified as an area including a certain number or more of types of, or a certain proportion or more of evaluated sensors whose detection performance levels are thresholds or lower in multiple vehicles. In this case, the decrease area may be determined only when a combination of specific types of sensors has the threshold detection performance levels or lower. It is preferable that the combination of the plurality of types of sensors is limited to a combination of sensors not complementary to each other in automatic driving of the vehicle.

In S43, the distribution portion 26 transmits information on the decrease area specified in S42 to the vehicle unit 1. For example, the decrease area information transmitted from the distribution portion 26 to the vehicle unit 1 may include a mesh number indicating the area, an evaluated detection performance, and sensor identification information on the sensor whose detection performance has been evaluated, and others. When multiple detection performances are evaluated for sensors of an identical classification, an average value, an intermediate value, a standard deviation value or the like may be adopted, for example.

At the time of transmission of decrease area information, the decrease area information may be transmitted only to a base station or a roadside device in the vicinity of the decrease area to reduce useless transmission of the information.

(Vehicle control related process)

Figure 12:
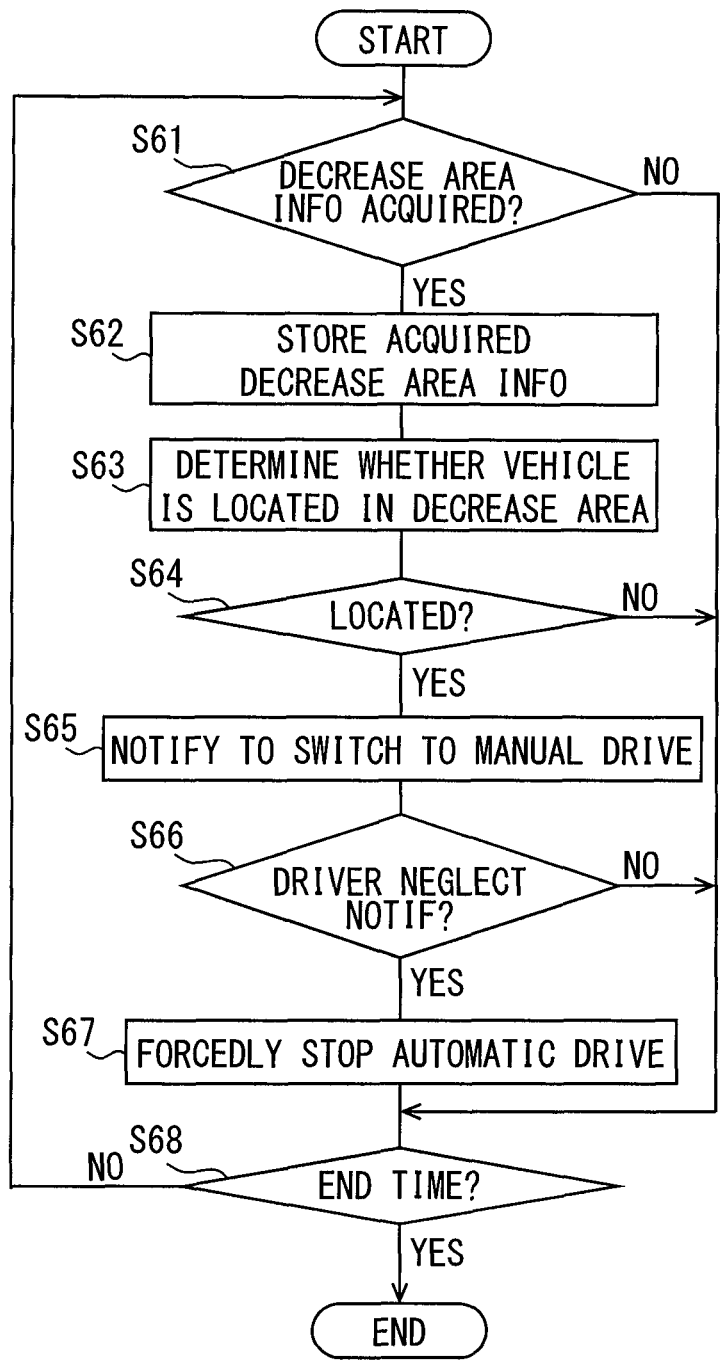
FIG. 12 is a flowchart showing an example of a flow of a vehicle control related process performed by the drive assistance ECU.

An example of a flow of a vehicle control related process performed by the drive assistance ECU 17 at the time of reception of decrease area information transmitted from the center 2 will be hereinafter described with reference to a flowchart shown in FIG. 12. As described above, the vehicle control related process is a process in which processes such as issuing notification and stopping automatic driving are performed based on decrease area information transmitted from the center 2. The flowchart shown in FIG. 12 may be configured to start when the ignition power source of the vehicle is turned on, for example.

When it is determined in S61 that decrease area information transmitted from the center 2 has been acquired by the distribution information acquisition portion 173 (S61: YES) via the communicator 11, the flow shifts to S62. When it is determined that decrease area information has not been acquired by the distribution information acquisition portion 173 (S61: NO), the flow shifts to S68.

In S62, the decrease area information acquired by the distribution information acquisition portion 173 is stored in the distribution information storage portion 174.

In S63, the decrease determination portion 175 determines whether the subject vehicle is located in a decrease area, based on the vehicle position detected by the position detector 12 and included in sensing information acquired by the sensing information acquisition portion 171, and the decrease area information stored in the distribution information storage portion 174.

For example, extracted herein is information on a decrease area corresponding to a mesh number of a mesh including the vehicle position of the subject vehicle. When information on a decrease area is not extracted, it is determined that the area containing the subject vehicle is not a decrease area. On the other hand, when information on a decrease area is extracted, it is determined whether the area containing the subject vehicle is a decrease area based on a detection performance contained in detection performances of respective sensors included in the extracted decrease area information, as a detection performance corresponding to a sensor of a type and a classification identical to the type and the classification of the sensor mounted on the subject vehicle. More specifically, it is determined whether the current area is a decrease area for the subject vehicle based on a detection performance contained in capabilities of respective sensors included in the extracted decrease area information, as a detection performance corresponding to a sensor of a type and a classification identical to the type and the classification of the sensor on the subject vehicle and evaluated by the detection performance evaluation portion 23. Even when a detection performance of a sensor decreases in a certain area, this area does not become a decrease area for the subject vehicle in case that the subject vehicle does not use this sensor for automatic driving.

For example, the decrease determination portion 175 may determine that the area containing the subject vehicle is a decrease area when a certain number or more, or a certain proportion or more of sensors of types and classifications identical to the types and the classifications of the sensors mounted on the subject vehicle have detection performance levels of thresholds or lower in the corresponding area. Alternatively, the decrease determination portion 175 may determine that the area containing the subject vehicle is a decrease area only when a combination of specific types of sensors has the threshold detection performance levels or lower. It is preferable that the combination of the plurality of types of sensors based on which a decrease area is specified is limited to a combination of sensors not complementary to each other in automatic driving of a vehicle.

When the decrease determination portion 175 determines that the subject vehicle is located in a decrease area in S64 (S64: YES), the flow shifts to S65. On the other hand, when the decrease determination portion 175 determines that the subject vehicle is not located in a decrease area (S64: NO), the flow shifts to S68.

In S65, the notification process portion 176 allows the notification device 15 to issue notification that urges the driver to switch automatic driving to manual driving. This notification corresponds to an example of driving switch notification. For example, an operation input portion, such as a switch operated to switch between automatic driving and manual driving, is provided on the vehicle to allow switching between automatic driving and manual driving in accordance with an operation input to the operation input portion.

When it is determined in S66 that the driver has neglected the notification issued in S65 (S66; YES), the flow shifts to S67. On the other hand, when it is determined that the driver has followed the notification issued in S65 (S66: NO), the flow shifts to S68. For example, a state that the driver has neglected the notification issued in S65 may be determined based on a state that automatic driving has not been switched to manual driving within a predetermined period from the issue of the notification in S65.

In S67, the automatic driving controller 177 forcedly stops automatic driving. For example, the automatic driving controller 177 may forcedly switch automatic driving to manual driving after a stop of the subject vehicle, for example. The automatic driving controller 177 corresponds to an example of an automatic driving stop portion.

When it is determined that the current time is a time for ending the vehicle control related process in S68 (S68: YES), the vehicle control related process ends. On the other hand, when it is determined that the current time is not the time for ending the vehicle control related process (S68: NO), the flow returns to S61 and repeats the process. The time for ending the vehicle control related process may be a time when the ignition power source of the vehicle is turned off, for example.

The automatic driving controller 177 may be configured to switch manual driving to automatic driving when the decrease determination portion 175 determines that the subject vehicle is not located in the decrease area after switching from automatic driving to manual driving. In this case, it is preferable that the automatic driving controller 177 switches driving after confirming an intention of the user based on input to the operation input portion or the like in response to notification issued by the notification device 15 for inquiring whether to switch driving to automatic driving under control of the notification process portion 176.

According to the configuration of the first embodiment, automatic driving stops when the subject vehicle is located in a decrease area where a detection performance of a sensor detecting sensing information for automatic driving decreases. This decrease area is specified based on a detection performance of a sensor evaluated with reference to sensing information obtained from a different vehicle that includes sensors of types and classifications identical to the types and classifications of multiple types of sensors mounted on the subject vehicle. In this case, automatic driving stops when the vehicle is located in the decrease area without the necessity of evaluating detection performances of the sensors based on sensing information detected by the sensors of the subject vehicle. As a result, automatic driving is allowed to stop prior to actual decreasing of detection performances of the sensors mounted on the subject vehicle.

Accordingly, a stop of automatic driving is realizable prior to actual decreasing of a detection performance of a sensor provided on a vehicle and used for automatic driving when the vehicle is located in a region where the detection performance of the sensor easily decreases.

Moreover, according to the configuration of the first embodiment, the detection performance evaluation portion 23 included in the center 2 evaluates detection performances of the sensors based on sensing information. Accordingly, a process load on the drive assistance ECU 17 decreases in comparison with such a configuration where the drive assistance ECU 17 evaluates detection performances of the sensors.

Furthermore, according to the configuration of the first embodiment, evaluation of detection performances of sensors is achieved based on a comparison with information constituted by map data obtained by measurement, and therefore a comparison with information not variable by disturbance as described above. Accordingly, more accurate evaluation of detection performances of sensors is achievable.

According to the configuration of the first embodiment, a decrease area is specified based on evaluation of detection performances of multiple types of sensors operated under different detection principles. Accordingly, automatic driving may be made to stop only in such a decrease area where detection performances of multiple types of sensors decrease. Some problems in automatic driving are caused not as a result of an abnormality of only one type of sensor, but as a result of simultaneous abnormalities of multiple types of sensors. Even in this case, automatic driving more accurately stops in a region where automatic driving needs to stop according to the configuration of the first embodiment.

Moreover, according to the configuration of the first embodiment, automatic driving stops in a region where the detection performance of the sensor having the same type and the same classification as the sensor of the subject vehicle is decreased. Accordingly, automatic driving more accurately stops in a region where automatic driving needs to stop.

FIRST MODIFIED EXAMPLE

According to the first embodiment, the drive assistance ECU 17 determines whether to stop automatic driving. However, other configurations may be adopted in this point. For example, when a vehicle is located in a decrease area, an instruction for stopping automatic driving may be added to decrease area information transmitted from the center 2 to allow the drive assistance ECU 17 to forcedly stop automatic driving in accordance with this instruction.

SECOND MODIFIED EXAMPLE

The drive assistance ECU 17 having received decrease area information transmitted from the center 2 may transfer this decrease area information to the drive assistance ECU 17 of a different vehicle via inter-vehicle communication. According to this configuration, the drive assistance ECU 17 of the subject vehicle in an inter-vehicle communicative state with a different vehicle acquires decrease area information transmitted from the center 2 via communication with the different vehicle even when communication between the subject vehicle and the center 2 is difficult.

THIRD MODIFIED EXAMPLE

Detection performances of sensors evaluated by the center 2 according to the first embodiment may be evaluated by a vehicle drive assistance ECU 17a in an alternative configuration (hereinafter referred to as a third modified example). For convenience of explanation, parts having functions identical to functions of parts depicted in the figures referred to in the foregoing embodiment are given identical reference signs, and the same explanation of these parts is not repeated in the description of the third modified example and the following examples. The drive assistance ECU 17*a* corresponds to an example of the onboard device.

Figure 13:
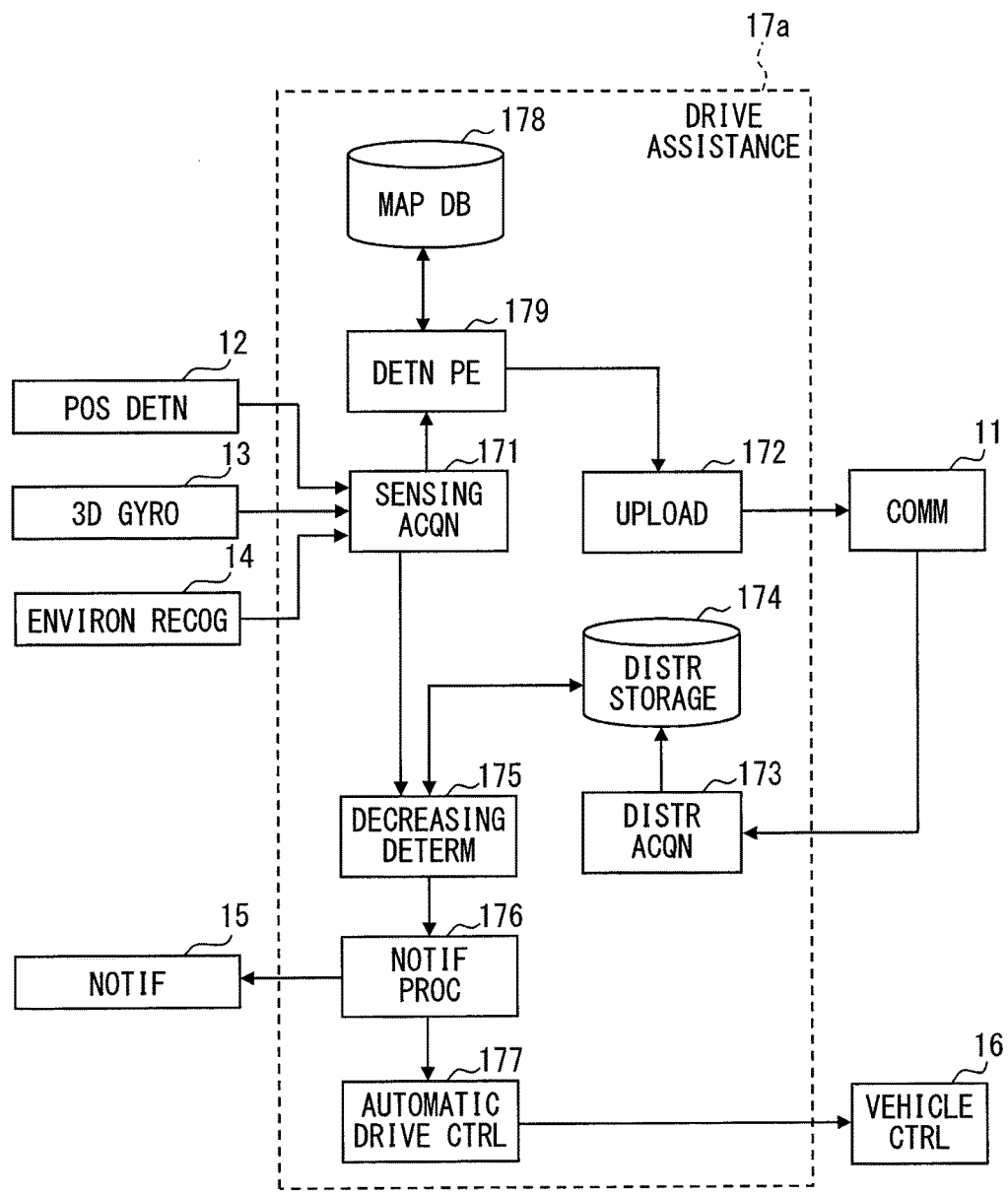
FIG. 13 is a block diagram illustrating an example of a schematic configuration of a drive assistance ECU according to a third modified example.

As illustrated in FIG. 13, the drive assistance ECU 17*a* according to the third modified example has a configuration similar to the configuration of the drive assistance ECU 17 except that a map DB 178 and a detection performance evaluation portion 179 are added.

It is assumed that the map DB 178 is similar to the map DB 22 described above. The detection performance evaluation portion 179 evaluates detection performances of sensors such as the position detector 12, the 3D gyro sensor 13, and the environment recognition system 14 based on the sensing information acquired by the sensing information acquisition portion 171 similarly to the detection performance evaluation portion 23 described above. The detection performance evaluation portion 179 also corresponds to an example of the evaluation portion (more specifically, vehicle evaluation portion).

The upload portion 172 of the drive assistance ECU 17*a* may be configured to transmit a detection performance of a sensor evaluated by the detection performance evaluation portion 179 in association with sensor identification information on the evaluated sensor, transmission source identification information, and a time stamp.

When the configuration of the third modified example is adopted, the map DB 22 and the detection performance evaluation portion 23 are eliminated from the center 2, for example. In this case, detection performances of sensors acquired by the upload information acquisition portion 21 of the center 2 are registered in the sensor information management DB 24, for example.

FOURTH MODIFIED EXAMPLE

According to the first embodiment, decrease area information transmitted from the center 2 is broadcasted without specifying a transmission destination. However, other configurations may be adopted in this point. For example, the center 2 may issue notification only to the drive assistance ECU 17 in response to the request from the drive assistance ECU 17 in an alternative configuration (hereinafter referred to as a fourth modified example).

Figure 14:
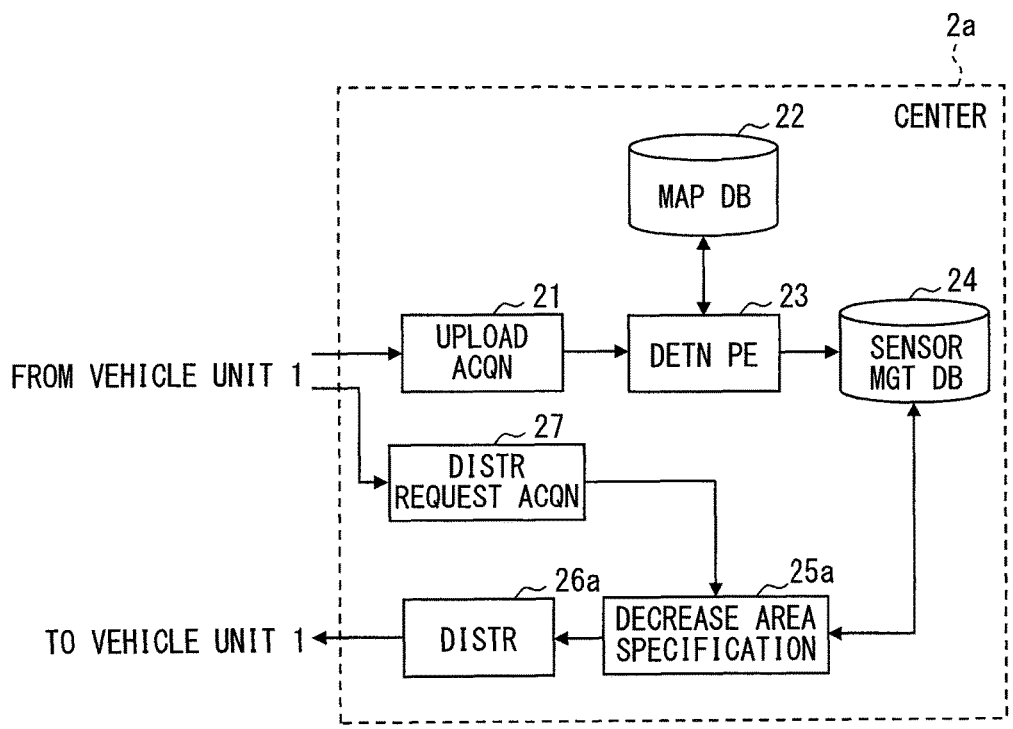
FIG. 14 is a block diagram illustrating an example of a schematic configuration of a center according to a fourth modified example.

As illustrated in FIG. 14, a center 2*a* according to the fourth modified example is similar to the center 2*a* except that a distribution request acquisition portion 27 is provided, and that a decrease area specification portion 25*a* and a distribution portion 26*a* are provided in place of the decrease area specification portion 25 and the distribution portion 26.

The distribution request acquisition portion 27 acquires a distribution request transmitted from the drive assistance ECU 17 via the communicator 11. It is assumed in the fourth modified example that a distribution request associated with the position of the vehicle detected by the position detector 12, sensor identification information on the respective sensors 12 to 14, and transmission source identification information is transmitted when the ignition power source of the subject vehicle is turned on, and at fixed time intervals in the on-state of the ignition power source. Accordingly, the distribution request acquisition portion 27 corresponds to an example of a vehicle position acquisition portion.

The decrease area specification portion 25*a* specifies a decrease area based on information registered in the sensor information management DB 24 similarly to the decrease area specification portion 25 when a distribution request is received by the distribution request acquisition portion 27. The vehicle on which the drive assistance ECU 17 as a transmission source of the distribution request is mounted is hereinafter referred to as a target vehicle.

The decrease area specification portion 25*a* determines whether the target vehicle is located in a decrease area based on information on the specified decrease area, and the vehicle position contained in the distribution request. For example, extracted herein is information on a decrease area corresponding to a mesh number of a mesh containing the vehicle position of the subject vehicle. When information on a decrease area is not extracted, it is determined that the area containing the subject vehicle is not a decrease area. When the decrease area information is extracted, the degree of severity of an effect on automatic driving is determined based on a detection performance of a sensor contained in detection performances of sensors included in the decrease area information as a detection performance corresponding to a type and a classification identical to the type and the classification of the sensor mounted on the subject vehicle. For example, the degree of severity is selected from multiple stages such as "low", "middle", and "high" increasing in this order in accordance with increase in the number of types or proportion of sensors whose detection performance levels are thresholds or lower.

The distribution portion 26*a* transmits instruction information for stopping automatic driving of the vehicle to the drive assistance ECU 17 corresponding to the transmission source of the distribution request when the degree of severity specified by the decrease area specification portion 25*a* is "middle" or "high". Accordingly, the distribution portion 26*a* corresponds to an example of an instruction transmission process portion. On the other hand, when the decrease area specification portion 25*a* determines that the subject vehicle is not located in a decrease area, or when the degree of severity specified by the decrease area specification portion 25*a* is "low", the distribution portion 26*a* transmits information indicating no problem to the drive assistance ECU 17 that is the transmission source of the distribution request.

When the drive assistance ECU 17 receives the instruction information for stopping automatic driving of the vehicle, the automatic driving controller 177 stops automatic driving. When the driver neglects notification issued from the notification device 15 to the driver to urge the driver to switch automatic driving to manual driving, automatic driving may be forcedly stopped similarly to the first embodiment. On the other hand, when the drive assistance ECU 17 receives information indicating no problem, the automatic driving controller 177 continues automatic driving.

FIFTH MODIFIED EXAMPLE

According to the foregoing embodiment and modified examples, the drive assistance ECU 17 or 17*a* stops automatic driving when the subject vehicle is located in a decrease area. However, other configuration may be adopted in this point. For example, when a recommended route calculated by an onboard navigation system or the like passes through a decrease area, a drive assistance ECU 17*b* may stop automatic driving of the vehicle in an alternative configuration (hereinafter referred to as a fifth modified example). The drive assistance ECU 17*b* corresponds to an example of the onboard device.

Figure 15:
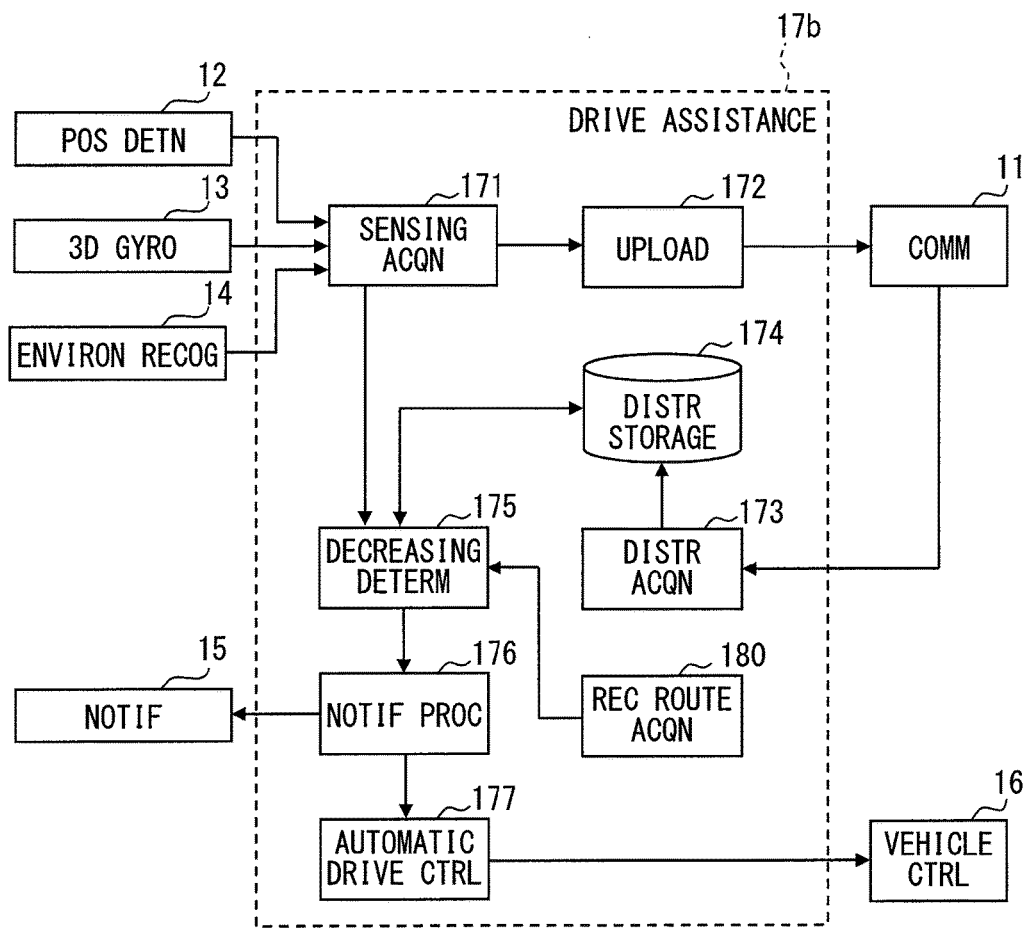
FIG. 15 is a block diagram illustrating an example of a schematic configuration of a drive assistance ECU according to a fifth modified example.

As illustrated in FIG. 15, the drive assistance ECU 17*b* according to the fifth modified example is similar to the drive assistance ECU 17 except in that a recommended route acquisition portion 180 is added, and that a part of the process performed by the decrease determination portion 175 is different.

The recommended route acquisition portion 180 acquires a recommended route calculated by an in-vehicle navigation system or the like. The decrease determination portion 175 determines whether the recommended route acquired by the recommended route acquisition portion 180 passes through a decrease area in a manner similar to determination of whether the subject vehicle is located in a decrease area. The notification process portion 176 subsequently allows the notification device 15 to issue notification for urging the driver to switch automatic driving to manual driving, or allows the automatic driving controller 177 to stop automatic driving immediately before the vehicle reaches a section of the recommended route determined as a section passing through the decrease area.

According to this configuration, automatic driving stops before the vehicle enters a region where detection performances of sensors used for automatic driving easily decrease.

SIXTH MODIFIED EXAMPLE

According to the first embodiment, automatic driving forcedly stops when the driver neglects notification that has been issued from the notification device 15 to urge the driver to switch automatic driving to manual driving. However, other configurations may be adopted in this point. For example, only notification may be issued without further process, or driving may be automatically stopped as a forced stop of driving without notification for urging the driver to switch automatic driving to manual driving.

SEVENTH MODIFIED EXAMPLE

According to the first embodiment, the sensors are constituted by the position detector 12, the 3D gyro sensor 13, and the environment recognition system 14 presented by way of example. However, other configurations may be adopted in this point. Other sensors may be used as long as the sensors provide sensing information for automatic driving of a vehicle. For example, a distance measurement sensor such as a radar may be used. When a distance measurement sensor is adopted, a detection performance may be evaluated based on a comparison between a position of a target detected from a detection result of the distance measurement sensor and a position of the target on map data.

The present disclosure is not limited to the embodiments described herein, but may be practiced with various modifications. An embodiment appropriately combining technical means disclosed in different embodiments is included in the technical scope of the present disclosure.

EIGHTH MODIFIED EXAMPLE

According to the foregoing embodiment, the detection performance of the 3D gyro sensor 13 is evaluated based on a comparison between an altitude change track generated by a time-series arrangement of sensing information of the 3D gyro sensor 13 and an actual gradient of a link contained in map data. However, the evaluation method of the detection performance of the 3D gyro sensor 13 is not limited to this method.

For example, the detection performance of the 3D gyro sensor 13 may be evaluated by a comparison between a predetermined threshold and a degree of calculated variances of sensing information on the 3D gyro sensor 13 obtained within a fixed period from a certain point of time. The degree of variances used herein may be dispersion or standard deviation used in statistics, for example. In addition, the fixed period used herein may be a period for collecting a necessary number of sets of sensing information for calculating the degree of variances.

According to the configuration of this mode, determination of temporary instability of a detection result of the 3D gyro sensor 13 is achievable. Moreover, specification of an area having the temporary unstable detection result of the 3D gyro sensor 13 (that is, decrease area) is therefore achievable.

Figure 16:
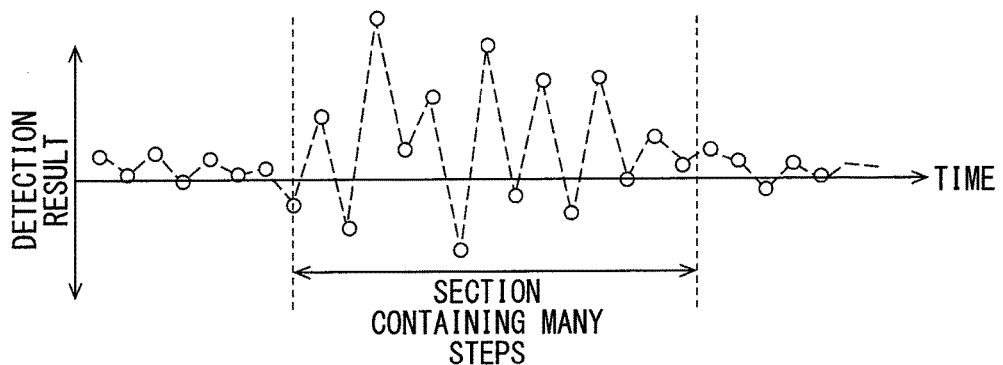
FIG. 16 is a view illustrating a concept of an unstable state of a detection result of a sensor.

Examples of the area having the temporary unstable detection result of the 3D gyro sensor 13 include an area containing many steps in roads, an area where disturbance such as strong wind easily occurs, and an area where a road may vibrate, such as an area on a bridge. When the vehicle is traveling in an area containing many steps on roads, an area where disturbance such as strong wind easily occurs, and an area where a road may vibrate, such as an area on a bridge, variances of the detection result of the 3D gyro sensor 13 easily increase as illustrated in FIG. 16.

The detection performance of the 3D gyro sensor 13 illustrated in an eighth modified example may be evaluated by the center 2 similarly to the embodiment, or may be evaluated by the detection performance evaluation portion 179 included in the drive assistance ECU 17a as described in the third modified example.

NINTH MODIFIED EXAMPLE

According to the eighth modified example described above, the detection performance of the 3D gyro sensor 13 is evaluated based on the detection results of the corresponding sensor obtained at multiple points of time by way of example. However, detection performances of other types of sensors may be evaluated based on detection results of the corresponding sensors obtained at multiple points of time.

For example, when the vehicle unit 1 includes a distance measurement sensor (such as millimeter-wave radar) as a sensor, a detection performance of the distance measurement sensor may be evaluated based on the degree of calculated variances of a detection distance measured by the distance measurement sensor for each fixed period. Examples of a state exhibiting a high degree of variances of the detection distance measured by the distance measurement sensor (that is, unstable state) include a state containing diffused reflection of exploration waves. When the exploration waves are radio waves, it is estimated that the degree of variances of the detection distance measured by the distance measurement sensor relatively increases even with the presence of radio waves at the frequency of the exploration waves as noise.

When the vehicle unit 1 has a function of inter-vehicle communication (hereinafter referred to vehicle to vehicle communicator), the detection performance evaluation portion 179 may evaluate a detection performance of the vehicle to vehicle communicator based on a predetermined index indicating communication quality. Examples of the index indicating communication quality herein include a data reception failure rate for a fixed period (that is, packet loss rate). For example, the detection performance evaluation portion 179 may determine the detection performance of the vehicle to vehicle communicator as a relatively low-level capability when the packet loss rate becomes a predetermined threshold or higher.

According to this mode, an area that contains radio waves interfering with inter-vehicle communication is determined as a decrease area for the vehicle to vehicle communicator, and added to the sensor information management DB 24. The vehicle to vehicle communicator that functions as a sensor for acquiring traffic information around the vehicle unit 1 also corresponds to an example of the sensor.

In the configuration that includes the environment recognition system 14 realized by a camera provided on the vehicle, the detection performance evaluation portion 179 may determine the detection performance of the environment recognition system 14 as a low-level capability when a frequency of failure of detection of a target supposed to be detected at the current position for a fixed period becomes a predetermined threshold or higher.

Determination of whether detection of a target supposed to be detected at the current position has been failed may be made based on position information contained in map data and indicating targets such as a white line and a sign. More specifically, the detection performance evaluation portion 179 may acquire a target supposed to be detected at the current position based on the current position and the map data, and sequentially determine whether the corresponding target has been detected by the environment recognition system 14.

According to this mode, the decrease area specification portion 25 also specifies a decrease area for the environment recognition system 14 based on an image captured by the camera. Possible examples of an area exhibiting a decreased detection performance of the environment recognition system 14 detected based on an image captured by the camera include a snowing area, and a low visibility area caused by fog or snowstorm. Possible examples of an area exhibiting a decreased detection performance of the environment recognition system 14 detected based on an image captured by the camera further include a backlight portion, and a portion where luminance of a captured image is easily relativized, such as a portion close to entrance and exit of a tunnel.

Figure 17:
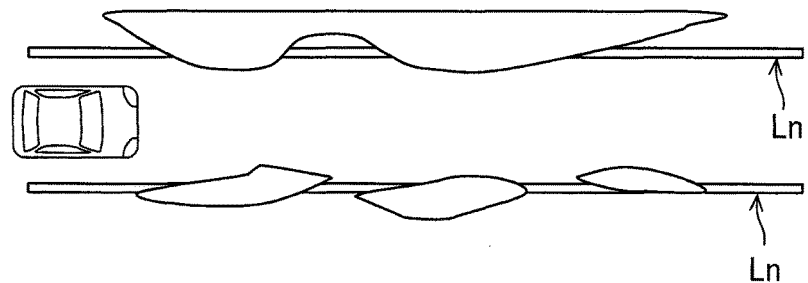
FIG. 17 is a schematic view illustrating a state of a vehicle traveling on a road covered with snow.

For example, a white line Ln covered with snow is difficult to detect from a captured image as illustrated in FIG. 17. In this case, it is highly probable that evaluation of a decreased detection performance is given during traveling in an area covered with snow. Accordingly, an area covered with snow is dynamically reflected in the sensor information management DB 24 as a decrease area. This applies to a backlight portion, a portion where luminance of a captured image is easily relativized, such as a portion close to entrance and exit of a tunnel, and an area of a low visibility area caused by fog or snowstorm.

While the detection performance of the environment recognition system 14 is evaluated based on a frequency of failure of detection of a target, other configurations may be adopted in this point. Decreasing of the detection performance of the environment recognition system 14 may be determined when a state of failure of detection of the target supposed to be detected continues for a fixed period or a fixed section.

TENTH MODIFIED EXAMPLE

The evaluation method of the detection performance of the environment recognition system 14 is not limited to the method described above. For example, when the environment recognition system 14 is realized by multiple types of sensors (environment recognition sensors), the environment recognition sensors having decreased detection performances may be specified under a majority rule based on a comparison between detection results of the plurality of environment recognition sensors. Each of the environment recognition sensors also corresponds to an example of the sensor.

Figure 18:
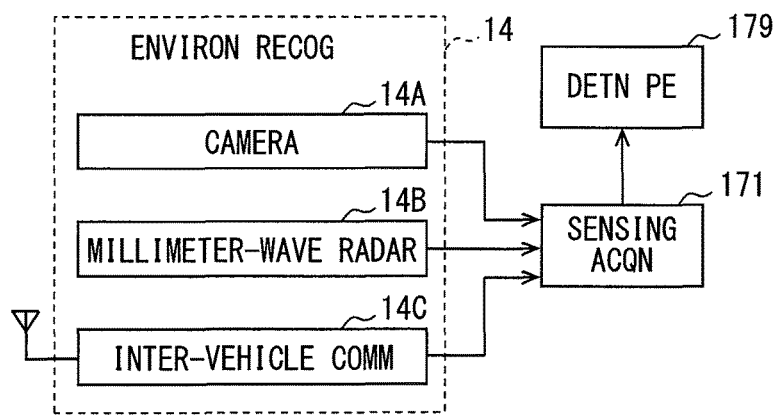
FIG. 18 is a block diagram schematically illustrating a configuration of an environment recognition system including multiple types of sensors.

Discussed herein is an example of the environment recognition sensor mounted on the vehicle and including a camera 14A that images the front of the vehicle, a millimeter radar 14B that has a detection direction extending toward the front of the vehicle, and an vehicle to vehicle communicator 14C that realizes inter-vehicle communication as illustrated in FIG. 18. It is assumed that each of the vehicles performing inter-vehicle communication simultaneously transmits vehicle information containing the current position of the corresponding vehicle via inter-vehicle communication.

It is assumed in this configuration that the camera 14A detects a vehicle corresponding to a proceeding vehicle, and that the vehicle to vehicle communicator 14C also receives vehicle information from the vehicle located at the position of the proceeding vehicle. In this state, the detection performance evaluation portion 179 determines decreasing of the detection performance of the millimeter radar 14B (such as level 1) when the millimeter radar 14B does not detect the presence of the vehicle corresponding to the proceeding vehicle. This determination is made based on the fact that the number of the environment recognition sensors having detected the presence of the vehicle corresponding to the proceeding vehicle is two (camera 14A and vehicle to vehicle communicator 14C), and that the millimeter radar 14B is only the environment recognition sensor not detecting the presence of the vehicle corresponding to the proceeding vehicle.

According to this mode, the environment recognition sensor having a relatively lower detection performance is specified from multiple types of recognition sensors constituting the environment recognition system 14.

ELEVENTH MODIFIED EXAMPLE

According to the mode of the tenth modified example described above, a sensor having a decreased detection performance is specified based on a comparison between respective detection results obtained by multiple types of environment recognition sensors. However, other configurations may be adopted in this point. When multiple environment recognition sensors of an identical type are provided, a sensor having a decreased detection performance may be specified under a majority rule based on a comparison between respective detection results of the plurality of environment recognition sensors of the identical type.

For example, in the presence of the four millimeter radars 14B having a detection direction extending toward the front of the vehicle, when three of the four millimeter radars 14B detect a vehicle corresponding to a proceeding vehicle, the remaining one millimeter radar 14B that does not detect the corresponding proceeding vehicle may be determined as a radar having a decreased detection performance.

TWELFTH MODIFIED EXAMPLE

When receiving a cancellation operation from the user for cancelling control performed by the vehicle control ECU 16, the detection performance evaluation portion 179 may determine that the detection performance of the sensor corresponding to the cancelled control has a relatively low-level capability. Examples of the control in this context include acceleration and deceleration control for acceleration or deceleration to reach a predetermined target speed, and steering control for a lane change or a turn.

For example, when the user performs the cancelling operation during execution of a deceleration process by the vehicle control ECU 16 for reaching a predetermined target speed based on a detection result from the environment recognition system 14, the detection performance of the environment recognition system 14 is determined as a low-level capability. The cancelling operation in this case may be an operation of an accelerator.

When detection results of multiple sensors are used for determining cancellation of control by the user, a degree of decreasing of a detection performance of a sensor to be determined may be raised with increase in priority of reference to the corresponding detection performance for determining cancellation of the control.

THIRTEENTH MODIFIED EXAMPLE

Information uploaded from the vehicle unit 1 to the center 2 is not limited to information indicating detection results of the sensors (that is, sensing information), but may be information indicating detection performances of respective sensors evaluated by the detection performance evaluation portion 179 (detection performance information). This configuration is applicable to a case when evaluation of detection performances not by the center 2 but by the vehicle unit 1 is more preferable depending on the types of sensors and the evaluation method of detection performances in consideration of the respective modified examples described above.

Detection performance information concerning a certain sensor is uploaded in association with sensor identification information on the corresponding sensor, transmission source identification information for specifying a transmission source, a time stamp, and position information indicating a current vehicle position. The vehicle unit 1 may upload both sensing information and detection performance information to the center 2.

FOURTEENTH MODIFIED EXAMPLE

Figure 19:
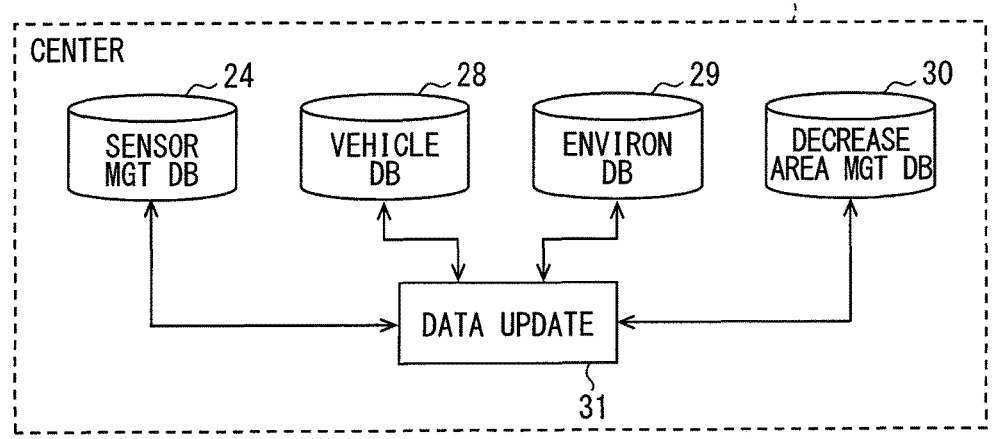
FIG. 19 is a block diagram illustrating a schematic configuration of a center according to a fourteenth modified example.

According to the foregoing embodiment, the sensor information management DB 24 is presented as a database included in the center 2 by way of example. However, the database included in the center 2 is not limited to the sensor information management DB 24. As illustrated in FIG. 19, the center 2 may include a vehicle information database 28, an environment information database 29, a decrease area management database 30, and a data update portion 31 in an alternative configuration (hereinafter referred to as a fourteenth modified example) in addition to the configuration of the above-described embodiment. The "database" included in each of the names of the databases is hereinafter abbreviated as "DB". Each of the various types of databases may be realized as a rewritable storage medium.

Note that FIG. 19 does not show the upload information acquisition portion 21, the map DB 22, the detection performance evaluation portion 23, the decrease area specification portion 25, and the distribution portion 26. In addition, when the vehicle unit 1 includes the drive assistance ECU 17a as in the configuration described in the third modified example, the center 2 is not required to include the map DB 22 and the detection performance evaluation portion 23.

The vehicle information DB 28 is a database that stores and manages information for each vehicle, as information on sensors mounted on each of multiple vehicles provided with the vehicle unit 1 for each. For example, the vehicle information DB 28 stores data for each vehicle as data indicating a period of continuous use, an installation position and the like for each sensor mounted on the corresponding vehicle as illustrated in FIG. 20. Each of the plurality of vehicles may be identified based on a vehicle ID or a device ID of the communicator 11. It is assumed that the vehicle information DB 28 also stores types of the vehicles in association with the corresponding vehicles.

When the center 2 manages information on sensors mounted on each of the vehicles with the vehicle information DB 28 thus introduced, the detection performance evaluation portion 23 is allowed to evaluate detection performances in consideration of effects such as aging of sensors.

The environment information DB 29 is a database that stores external environment information for each area in association with time information. Examples of the external environment information herein include weather information such as the weather, a temperature, a precipitation, and a wind speed (see FIG. 21), for example. The external environment information may further include a degree of traffic congestion for each predetermined section of a road included in an area, and information indicating a weekday or a holiday, for example. The external environment information may be supplied from the plurality of vehicle units 1, or a part or the whole of information corresponding to the external environment information may be distributed from a server via the Internet or a cellular phone network, for example.

The decrease area management DB 30 is a database that stores decrease area conditions for determining a decrease area for each area in association with vehicle types. Examples of items constituting decrease area conditions (factor items) include items corresponding to a time zone, and external environment information such as a weather and an atmospheric pressure. When types and categories of sensors used for automatic driving are different even within an identical vehicle type, the types and categories of the sensors used for automatic driving correspond to factor items.

Items corresponding to the factor items are items considered to have a strong correlation with sensors having decreased detection performances. The correlations between the respective items and detection performances of sensors may be determined through experiments, or may be determined based on statistically extracted common conditions for determining decreasing of a detection performance of a certain sensor for each of multiple vehicles.

Vehicle type information may include a column to which a type of vehicle is sequentially added, as a vehicle using a sensor determined as a sensor having a decreased detection performance in multiple vehicles uploading sensing information. A type of vehicle corresponding to a transmission source of sensing information may be specified by searching the vehicle information DB 28 based on a search key corresponding to transmission source identification information associated with sensing information.

In a more preferable mode, the decrease area management DB 30 stores detection performances of respective sensors contained in an area in association with vehicle types and factor items. FIG. 22 is a view illustrating a concept of an example of a data configuration stored in the decrease area management DB 30. For example, an area to which a mesh number 1 is given indicates that this area becomes a decrease area for a vehicle type B during raining in a period from June to August. This area becomes a decrease area since a detection performance level of the sensor B decreases to level 1.

The decrease area management DB 30 may be updated every time the decrease area specification portion 25 specifies a decrease area based on data stored in the sensor information management DB 24. In this case, data stored in the decrease area management DB 30 is updated in accordance with update of the data stored in the sensor information management DB 24. Update of data in the decrease area management DB 30 is executed by the data update portion 31 described below.

By the use of the decrease area management DB 30 thus introduced, the distribution portion 26 is allowed to distribute factor items for each vehicle type as information on a decrease area, and the decrease determination portion 175 of the vehicle unit 1 is allowed to determine whether the subject vehicle is located in a decrease area based on received factor items for each vehicle type.

The data update portion 31 updates contents stored in the respective databases. For example, the data update portion 31 registers an evaluation result in the sensor information management DB 24 every time the detection performance evaluation portion 23 evaluates a detection performance of a sensor contained in sensing information received by the upload information acquisition portion 21 based on the sensing information. Data after an elapse of a fixed period (such as one year) or longer from registration in the sensor information management DB 24 may be deleted.

In addition, the data update portion 31 updates data stored in the decrease area management DB 30 every time the decrease area specification portion 25 specifies a decrease area. The data update portion 31 also sequentially updates data stored in the vehicle information DB 28 and in the environment information DB 29. Determination accuracy of the decrease area specification portion 25 for determining whether an area is a decrease area improves by discarding old information, or rewriting old data with new data.

There may occur a phenomenon of re-uploading of sensing information to a vehicle located in an area (or identical place) where the same sensing information has been previously updated to the same vehicle. In this case, the data update portion 31 may replace a previous evaluation result stored in the sensor information management DB 24 with an evaluation result obtained by the detection performance evaluation portion 23 based on new sensing information.

It is noted that a flowchart or the process of the flowchart in the present application includes multiple steps (also referred to as sections), each of which is represented, for instance, as S1. Further, each step can be divided into several sub-steps while several steps can be combined into a single step.

While various embodiments, configurations, and aspects of drive assistance system and center have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A drive assistance system comprising:
   an onboard device that is mounted on a vehicle performing automatic driving based on sensing information detected by a sensor of the vehicle, wherein each of a plurality of vehicles performing automatic driving includes the onboard device and the sensor; and
   a center that communicates with the onboard device, wherein:
   the onboard device includes a sensing information acquisition portion that acquires the sensing information detected by the sensor;
   either the onboard device or the center includes an evaluation portion that evaluates a detection performance of the sensor based on the sensing information acquired by the sensing information acquisition portion;
   the center includes a region specification portion that specifies a decrease region where the detection performance of the sensor decreases based on the detection performance of the sensors and positions at which the sensing information has been detected by each of the sensors; and
   the onboard device stops the automatic driving when the vehicle is located in the decrease region specified by the region specification portion.

2. The drive assistance system according to claim 1, wherein:
   the onboard device includes a notification process portion that issues driving switch notification urging a driver to switch the automatic driving to manual driving; and
   the automatic driving is stopped based on the driving switch notification issued from the notification process portion.

3. The drive assistance system according to claim 1, wherein:
   the onboard device includes an automatic driving stop portion that stops the automatic driving; and
   the automatic driving is stopped by the automatic driving stop portion.

4. The drive assistance system according to claim 1, wherein:
   the center includes a decrease region transmission process portion that transmits information indicating the decrease region specified by the region specification portion to the onboard device; and
   the onboard device stops the automatic driving when the vehicle is located in the decrease region based on the information indicating the decrease region transmitted by the decrease region transmission process portion, and based on a current position of the vehicle.

5. The drive assistance system according to claim 1, wherein:
   the center includes a vehicle position acquisition portion that acquires a current position of the vehicle on which the onboard device is mounted;
   the center includes an instruction transmission process portion that transmits instruction information stopping the automatic driving of the vehicle when the vehicle is located in the decrease region based on the decrease region specified by the region specification portion, and based on the current position of the vehicle acquired by the vehicle position acquisition portion; and
   the onboard device stops the automatic driving in accordance with the instruction information received from the instruction transmission process portion.

6. The drive assistance system according to claim 1, wherein:
   the onboard device includes a recommended route acquisition portion that acquires a recommended route of the vehicle; and the automatic driving is stopped when the recommended route passes through the decrease region specified by the region specification portion.

7. The drive assistance system according to claim 1, wherein:
the center includes, as the evaluation portion, a center evaluation portion;
the onboard device transmits the sensing information acquired by the sensing information acquisition portion to the center; and
the center evaluation portion evaluates the detection performance of the sensor based on the sensing information transmitted from the onboard device.

8. The drive assistance system according to claim 1, wherein:
the sensor is configured by a plurality of types of sensors operated under different detection principles.

9. The drive assistance system according to claim 8, wherein:
the plurality of types of sensors include a sensor that detects the sensing information on either a position or a gradient; and
the evaluation portion evaluates the detection performance of the sensor based on an error between map information and the sensing information with respect to the sensor that detects the sensing information on either the position or the gradient.

10. The drive assistance system according to claim 8, wherein:
the plurality of types of sensors include sensors of different classifications in an identical type operated under an identical detection principle; and
the onboard device stops the automatic driving when the vehicle is located in the decrease region for the sensor of a classification identical to a classification of the sensor of the vehicle.

11. The drive assistance system according to claim 1, wherein:
the onboard device includes, as the evaluation portion, a vehicle evaluation portion that evaluates the detection performance of the sensor based on the sensing information acquired by the sensing information acquisition portion at a plurality of points of time;
the onboard device transmits detection performance information indicating the detection performance of the sensor evaluated by the vehicle evaluation portion to the center in association with a position of the onboard device at a point of time when the evaluation is determined; and
the region specification portion specifies the decrease region based on the detection performance information transmitted from each of a plurality of the vehicles.

12. The drive assistance system according to claim 1, wherein:
the region specification portion specifies the decrease region where the detection performance of the sensor mounted on the vehicle decreases based on the detection performance of the sensor mounted on a different vehicle and a position at which the sensor of the different vehicle detects the sensing information.

13. The drive assistance system according to claim 1, wherein:
the evaluation portion compares the sensing information and a map data stored in a map database; and
the evaluation portion determines that the detection performance of the sensor decreases greater as an error between the sensing information and the map data is greater.

14. A center comprising:
an upload information acquisition portion that communicates with an onboard device mounted on a vehicle performing automatic driving based on sensing information detected by a sensor of the vehicle, which is configured to perform automatic driving, wherein the upload information acquisition portion acquires the sensing information transmitted from each of the onboard device;
a center evaluation portion that evaluates a detection performance of the sensor based on the sensing information transmitted from the onboard device;
a region specification portion that specifies a decrease region where the detection performance of the sensor decreases based on the detection performance of the sensors and positions at which the sensing information has been detected by each of the sensors;
a distribution portion that transmits information on the decrease region to a particular onboard device; and
a map database that stores map data;
wherein:
the sensor of the vehicle includes at least one of a receiver for a global positioning system, a gyro sensor, a camera, or a radar; and
the center evaluation portion compares the sensing information acquired by the upload information acquisition portion with at least one of a road included in the map data, an actual gradient of a link included in the map data, actual coordinates of a target included in the map data, or a position of the target included in the map data, and evaluates the detection performance of the sensor in accordance with a degree of error.

15. The center according to claim 14, wherein:
the region specification portion specifies the decrease region where the detection performance of the sensor mounted on the vehicle decreases based on the detection performance of the sensor mounted on a second vehicle and a position at which the sensor of the second vehicle detects the sensing information.

16. The center according to claim 14, wherein:
the evaluation portion compares the sensing information and a map data stored in a map database; and
the evaluation portion determines that the detection performance of the sensor decreases greater as an error between the sensing information and the map data is greater.

17. The center according to claim 14, wherein:
the decrease region is specified based on (i) a detection performance which is obtained through evaluation of a corresponding sensing information acquired from another vehicle on which a corresponding sensor having an identical type and an identical classification with the sensor mounted on the vehicle, and (ii) a position information at which the corresponding sensor detects the corresponding sensing information.

18. A drive assistance system comprising:
an onboard device that is mounted on a vehicle performing automatic driving based on sensing information detected by a sensor of the vehicle, wherein each of a plurality of vehicles performing automatic driving includes the onboard device and the sensor; and
a server apparatus that communicates with the onboard device, wherein:
the onboard device includes an ECU that acquires the sensing information detected by the sensor;
at least one of the ECU of the onboard device and the server apparatus evaluates a detection performance of the sensor based on the sensing information acquired by the ECU of the onboard device;
the server apparatus specifies a decrease region where the detection performance of the sensor decreases based on the detection performance of the sensors and a corresponding position at which the sensing information has been detected by each of the sensors; and
the onboard device stops the automatic driving when the vehicle is located in the decrease region specified by server apparatus.

19. A drive assistance system comprising:
an onboard device that is mounted on a vehicle performing automatic driving based on sensing information detected by a sensor of the vehicle, wherein each of a plurality of vehicles performing automatic driving includes the onboard device and the sensor; and
a center that communicates with the onboard device, wherein:
the onboard device includes a sensing information acquisition portion that acquires the sensing information detected by the sensor;
either the onboard device or the center includes an evaluation portion that evaluates a detection performance of the sensor based on the sensing information acquired by the sensing information acquisition portion;
the center includes a region specification portion that specifies a decrease region where the detection performance of the sensor decreases based on the detection performance of the sensors and positions at which the sensing information has been detected by each of the sensors; and
the onboard device controls the automatic driving to be terminated before the vehicle positions at the decrease region.

20. The drive assistance system according to claim 19, wherein:
in a case where a navigation route passes the decrease region, the onboard device controls the automatic driving to be terminated before the vehicle arrives at the decrease region.

21. The drive assistance system according to claim 19, wherein:
when the onboard device controls the automatic driving to be terminated, a notification making a driver perform a manual driving instead of the automatic driving is provided.

22. The drive assistance system according to claim 21, wherein:
when the onboard device controls the automatic driving to be terminated, the automatic driving stops.

* * * * *

UNITED STATES PATENT AND TRADEMARK OFFICE
CERTIFICATE OF CORRECTION

| | | |
|---|---|---|
| PATENT NO. | : 10,479,377 B2 | Page 1 of 1 |
| APPLICATION NO. | : 15/521626 | |
| DATED | : November 19, 2019 | |
| INVENTOR(S) | : Kentarou Nishida | |

It is certified that error appears in the above-identified patent and that said Letters Patent is hereby corrected as shown below:

On the Title Page

(73) Assignee, "DENSON CORPORATION, Kariya, Aichi-pref. (JP)" should be -- DENSO CORPORATION, Kariya, Aichi-pref. (JP) --

Signed and Sealed this
Fifth Day of May, 2020

Andrei Iancu
*Director of the United States Patent and Trademark Office*